(12) United States Patent
Hancharik

(10) Patent No.: US 12,436,220 B2
(45) Date of Patent: *Oct. 7, 2025

(54) PAST EVENT SIGNAL TRACKING

(71) Applicant: Viasat, Inc., Carlsbad, CA (US)

(72) Inventor: David Hancharik, Norcross, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,037

(22) Filed: Jun. 12, 2024

(65) Prior Publication Data

US 2024/0329180 A1 Oct. 3, 2024

Related U.S. Application Data

(63) Continuation of application No. 17/601,805, filed as application No. PCT/US2020/028272 on Apr. 15, 2020, now Pat. No. 12,050,276.

(Continued)

(51) Int. Cl.
*G01S 3/38* (2006.01)
*H04B 7/06* (2006.01)

(52) U.S. Cl.
CPC .............. *G01S 3/38* (2013.01); *H04B 7/0617* (2013.01)

(58) Field of Classification Search
CPC ........ G01S 3/38; H04B 7/1851; H04B 7/0617
See application file for complete search history.

(56) References Cited

U.S. PATENT DOCUMENTS

| | | | |
|---|---|---|---|
| 5,856,804 A | 1/1999 | Turcotte et al. | |
| 5,859,610 A | 1/1999 | Lenormand et al. | |

(Continued)

FOREIGN PATENT DOCUMENTS

| | | |
|---|---|---|
| CN | 106793073 A | 5/2017 |
| CN | 108832985 A | 11/2018 |

(Continued)

OTHER PUBLICATIONS

Walker et al., Architecture, Implementation and Performance of Ground-Based Beam Forming in the DBSD G1 Mobile Satellite System, 28th American Institute of Aeronautics and Astronautics; International Communications Satellite Systems Conference, Sep. 2, 2010, 29 pgs.

(Continued)

*Primary Examiner* — Cassi J Galt
(74) *Attorney, Agent, or Firm* — Holland & Hart LLP

(57) ABSTRACT

Methods, systems, and devices for past event signal tracking are described. In some examples, a system may receive feed element signals corresponding to a set of feed elements of an antenna. To support a primary or real-time mission, the system may process the feed element signals according to a first beamforming configuration to generate spot beam signals, which may include communications scheduled for respective spot beams. To support a retroactive or searching mission, the system may also store the feed element signals for some duration. Based on a determination to search for a target signal from a target location within a coverage area of the antenna, the system may process the stored feed element signals according to a second beamforming configuration to generate a target spot beam signal corresponding to the target location, and evaluate the target spot beam signal for a presence of the target signal.

13 Claims, 10 Drawing Sheets

Related U.S. Application Data

(60) Provisional application No. 62/834,912, filed on Apr. 16, 2019.

(56) References Cited

U.S. PATENT DOCUMENTS

| | | |
|---|---|---|
| 6,768,913 B1 | 7/2004 | Molnar et al. |
| 7,787,819 B2 | 8/2010 | Walker et al. |
| 7,969,358 B2 | 6/2011 | Martin et al. |
| 8,232,918 B2 | 7/2012 | Chang |
| 8,744,360 B2 | 6/2014 | Zheng et al. |
| 8,948,747 B2 | 2/2015 | Feria et al. |
| 9,024,817 B2 | 5/2015 | Haque et al. |
| 11,310,674 B2 | 4/2022 | Reial |
| 12,050,276 B2 * | 7/2024 | Hancharik .......... H04B 7/0617 |
| 2004/0259497 A1 | 12/2004 | Dent et al. |
| 2008/0051080 A1 | 2/2008 | Walker et al. |
| 2008/0247274 A1 | 10/2008 | Seltzer et al. |
| 2009/0215419 A1 | 8/2009 | Farmer et al. |
| 2011/0268158 A1 | 11/2011 | Miller et al. |
| 2011/0304502 A1 | 12/2011 | Chen et al. |
| 2014/0266872 A1 | 9/2014 | Mitola, III |
| 2017/0085411 A1 | 3/2017 | Noerpel et al. |
| 2017/0187440 A1 | 6/2017 | Chang |
| 2017/0288769 A1 | 10/2017 | Miller et al. |
| 2024/0329180 A1 | 10/2024 | Hancharik |

FOREIGN PATENT DOCUMENTS

| | | |
|---|---|---|
| CN | 108832985 B | 10/2020 |
| EP | 3957001 B1 | 6/2023 |
| EP | 42113412 B2 | 9/2024 |
| JP | 200671597 A | 3/2006 |
| JP | 2009-008722 A | 1/2009 |
| JP | 2018-011150 A | 1/2018 |
| JP | 2018-537047 A | 12/2018 |
| KR | 1020150035374 A | 4/2015 |
| KR | 1020180135480 A | 11/2018 |
| RU | 2491685 C2 | 8/2013 |
| WO | WO2012067093 A1 | 5/2012 |
| WO | 2017/109955 A1 | 6/2017 |
| WO | WO2018190794 A1 | 10/2018 |
| WO | 2020214674 A1 | 10/2020 |

OTHER PUBLICATIONS

Liebschwager et al., Design of a Radar Based Space Situational Awareness System, Sep. 2013, 9 pages.

International Search Report and Written Opinion, PCT/US2020-028272, Oct. 22, 2020, 8 pages.

* cited by examiner

PAST EVENT SIGNAL TRACKING

CROSS REFERENCE

The present Application for Patent is a Continuation of U.S. patent application Ser. No. 17/601,805 by Hancharik, entitled "PAST EVENT SIGNAL TRACKING" filed Oct. 6, 2021, which is a 371 national phase filing of International Patent Application No. PCT/US2020/028272 by Hancharik, entitled "PAST EVENT SIGNAL TRACKING" filed Apr. 15, 2020, which claims the benefit of U.S. Provisional Patent Application No. 62/834,912 by Hancharik, entitled "PAST EVENT SIGNAL TRACKER (PEST)," filed Apr. 16, 2019, each of which is assigned to the assignee hereof, and each of which is expressly incorporated by reference herein, in its entirety.

BACKGROUND

The following relates generally to beamformed antenna systems and more specifically to past event signal tracking. In some beamformed antenna systems, such as a satellite communication system, a receiving device may include an antenna configured to receive signals at each of a set of feed elements of a feed array. A set of feed element signals may be processed according to a receive beamforming configuration, which may include applying a phase shift or amplitude scaling to respective ones of the feed element signals. The processing may be associated with generating spot beam signals corresponding to various spot beam coverage areas, which, in some examples, may support various allocations of communication resources across a service coverage area of the antenna.

SUMMARY

The described techniques relate to improved methods, systems, devices, and apparatuses that support past event signal tracking. In some examples, an antenna may be included in a vehicle such as a satellite, a plane, an unmanned aerial vehicle (UAV), or some other type of device that supports a communications service or other reception capability over a service coverage area. The antenna may include a feed array having a set of feed elements, and each of the feed elements may be associated with a feed element signal corresponding to received energy at the respective feed element. A reception processing system may receive the feed element signals, or other related signaling, and perform various beamforming techniques to support directional reception.

To support a primary or real-time mission or task (e.g., real-time communications), the reception processing system may process received signaling, such as feed element signals, according to a first beamforming configuration to generate one or more spot beam signals. Each of the spot beam signals may correspond to a respective spot beam of the antenna, and, in some examples, may include communications scheduled for respective ones of the plurality of spot beams (e.g., spot beam coverage areas).

To support a discovery or searching mission or task, such as past event signal tracking, the reception processing system may additionally or alternatively store received signaling, such as feed element signals, for some duration (e.g., in a rolling buffer). Based on a determination to search for a target signal at a target location within a service coverage area, and at some time within the duration of feed element signal storage, the reception processing system may process the stored signals according to a second beamforming configuration to generate a target spot beam signal corresponding to the target location. The reception processing system may evaluate the target spot beam signal for a presence of the target signal. The generation of a target spot beam and evaluation for a presence of the target signal may be repeated, in such examples as an iterative search at different locations over a same duration, or a path-following at different locations and different times durations, or a speculative evaluation according to different signal characteristic hypotheses. Thus, a reception processing system in accordance with examples as disclosed herein may support performing retroactive or iterative evaluations of stored signaling, such as feed element signals, to identify various signal sources, which may be beneficial in such applications as search and rescue missions, asset recovery, surveillance, crime investigation, downed pilot location, or internet of things applications, among other applications.

DETAILED DESCRIPTION

Figure 1A:
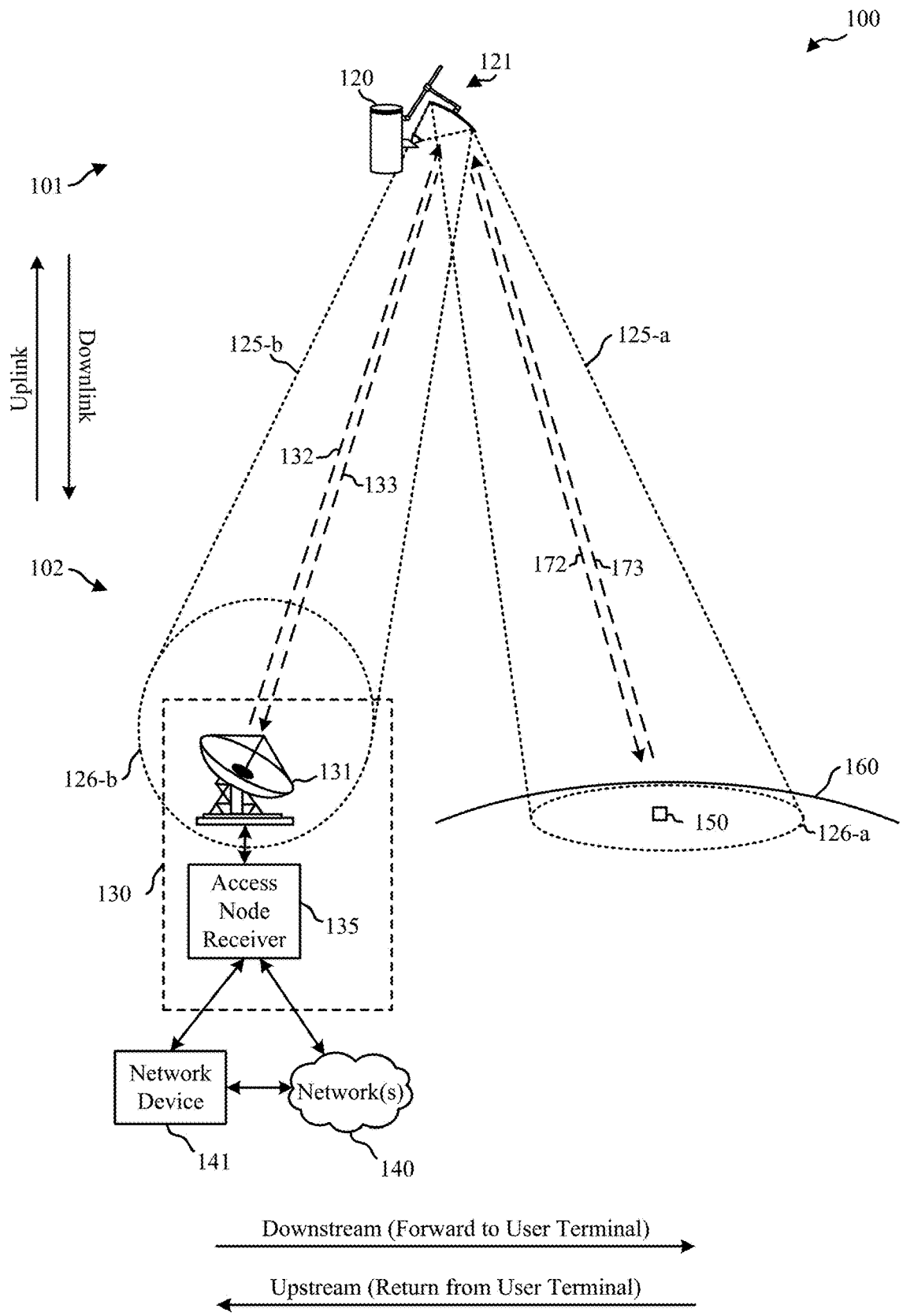
FIG. 1A shows a diagram of a communications system that supports past event signal tracking in accordance with examples as disclosed herein.

A system in accordance with the techniques described herein may support various examples of past event signal tracking. For example, a feed array antenna may be included in a vehicle such as a satellite, a plane, an unmanned aerial vehicle (UAV), or some other type of device that supports a communications service or other reception capability over a service coverage area. The antenna may include a feed array having a set of feed elements and, to support signal reception, each of the feed elements may be associated with a feed element signal corresponding to received energy at the respective feed element. A reception processing system may receive the feed element signals, or other related signaling, and perform various beamforming techniques to support directional reception. Components of a reception processing system may be included in one or more ground stations, or may be included in a satellite or other vehicle that may or may not include the antenna associated with the feed element signals being processed. In some examples, components of a reception processing system may be distributed among more than one device, including components distributed between a vehicle and a ground segment.

To support a primary or real-time mission or task (e.g., real-time communications), the reception processing system may process received signaling, such as feed element signals, according to a first beamforming configuration to generate one or more spot beam signals. Each of the spot beam signals may correspond to a respective spot beam of the antenna, and, in some examples, may include communications scheduled for respective ones of the plurality of spot beams (e.g., scheduled for respective spot beam coverage areas).

To support a retroactive or searching mission or task, such as past event signal tracking, the reception processing system may additionally or alternatively store the received signaling, such as feed element signals, for some duration (e.g., in a rolling buffer). Based on a determination to search for a target signal at a target location within a service coverage area, and at some time within the duration of signal storage, the reception processing system may process the stored signals according to a second beamforming configuration to generate a target spot beam signal corresponding to the target location, and evaluate the target spot beam signal for a presence of the target signal. Thus, a reception processing system in accordance with examples as disclosed herein may support performing retroactive evaluations of stored signals to identify various signal sources, which may be beneficial in such applications as search and rescue missions, recovery of high-value assets, surveillance, crime investigation, downed pilot location, or internet of things applications, among others. In some examples, such techniques may be performed in parallel with, or otherwise concurrently with a primary or real-time mission.

This description provides various examples of techniques for past event signal tracking, and such examples are not a limitation of the scope, applicability, or configuration of examples in accordance with the principles described herein. Rather, the ensuing description will provide those skilled in the art with an enabling description for implementing embodiments of the principles described herein. Various changes may be made in the function and arrangement of elements.

Thus, various embodiments in accordance with the examples disclosed herein may omit, substitute, or add various procedures or components as appropriate. For instance, it should be appreciated that the methods may be performed in an order different than that described, and that various steps may be added, omitted or combined. Also, aspects and elements described with respect to certain examples may be combined in various other examples. It should also be appreciated that the following systems, methods, devices, and software may individually or collectively be components of a larger system, wherein other procedures may take precedence over or otherwise modify their application.

FIG. 1A shows a diagram of a communications system 100 that supports past event signal tracking in accordance with examples as disclosed herein. Communications system 100 may use a number of network architectures including a space segment 101 and ground segment 102. The space segment 101 may include one or more satellites 120. The ground segment 102 may include one or more access node terminals 130 (e.g., gateway terminals, ground stations), as well as network devices 141 such as network operations centers (NOCs) or other central processing centers or devices, and satellite and gateway terminal command centers. In some examples, the ground segment 102 may also include user terminals 150 that are provided a communications service via a satellite 120.

In various examples, a satellite 120 may be configured to support wireless communication between one or more access node terminals 130 and/or various user terminals 150 located in a service coverage area, which, in some examples, may be a primary task or mission of the satellite 120. In some examples, a satellite 120 may be configured for information collection, and may include various sensors for detecting a geographical distribution of electromagnetic, optical, thermal, or other data (e.g., in a data collection or reception mission). In some examples, the satellite 120 may be deployed in a geostationary orbit, such that its orbital position with respect to terrestrial devices is relatively fixed, or fixed within an operational tolerance or other orbital window (e.g., within an orbital slot). In other examples, the satellite 120 may operate in any appropriate orbit (e.g., low Earth orbit (LEO), medium Earth orbit (MEO), etc.).

The satellite 120 may use an antenna assembly 121, such as a phased array antenna assembly (e.g., direct radiating array (DRA)), a phased array fed reflector (PAFR) antenna, or any other mechanism known in the art for reception or transmission of signals (e.g., of a communications or broadcast service, or a data collection service). When supporting a communications service, the satellite 120 may receive forward uplink signals 132 from one or more access node terminals 130 and provide corresponding forward downlink signals 172 to one or more user terminals 150. The satellite 120 may also receive return uplink signals 173 from one or more user terminals 150 and forward corresponding return downlink signals 133 to one or more access node terminals 130. A variety of physical layer transmission modulation and coding techniques may be used by the satellite 120 for the communication of signals between access node terminals 130 or user terminals 150 (e.g., adaptive coding and modulation (ACM)).

The antenna assembly 121 may support communication or other signal reception via one or more beamformed spot beams 125, which may be otherwise referred to as service beams, satellite beams, or any other suitable terminology. Signals may be passed via the antenna assembly 121 in accordance with a spatial electromagnetic radiation pattern of the spot beams 125. When supporting a communications service, a spot beam 125 may use a single carrier, such as one frequency or a contiguous frequency range, which may also be associated with a single polarization. In some examples, a spot beam 125 may be configured to support only user terminals 150, in which case the spot beam 125 may be referred to as a user spot beam or a user beam (e.g., user spot beam 125-*a*). For example, a user spot beam 125-*a* may be configured to support one or more forward downlink signals 172 and/or one or more return uplink signals 173 between the satellite 120 and user terminals 150. In some examples, a spot beam 125 may be configured to support only access node terminals 130, in which case the spot beam 125 may be referred to as an access node spot beam, an access node beam, or a gateway beam (e.g., access node spot beam 125-*b*). For example, an access node spot beam 125-*b* may be configured to support one or more forward uplink signals 132 and/or one or more return downlink signals 133 between the satellite 120 and access node terminals 130. In other examples, a spot beam 125 may be configured to service both user terminals 150 and access node terminals 130, and thus a spot beam 125 may support any combination of forward downlink signals 172, return uplink signals 173, forward uplink signals 132, and/or return downlink signals 133 between the satellite 120 and user terminals 150 and access node terminals 130.

A spot beam 125 may support a communications service between target devices (e.g., user terminals 150 and/or access node terminals 130), or other signal reception, within a spot beam coverage area 126. A spot beam coverage area 126 may be defined by an area of the electromagnetic radiation pattern of the associated spot beam 125, as projected on the ground or some other reference surface, having a signal power, signal-to-noise ratio (SNR), or signal-to-interference-plus-noise ratio (SINR) of spot beam 125 above a threshold. A spot beam coverage area 126 may cover any suitable service area (e.g., circular, elliptical, hexagonal, local, regional, national) and may support a communications service with any quantity of target devices located in the spot beam coverage area 126. In various examples, target devices such as airborne or underwater target devices may be located within a spot beam 125, but not located at the reference surface of a spot beam coverage area 126 (e.g., reference surface 160, which may be a terrestrial surface, a land surface, a surface of a body of water such as a lake or ocean, or a reference surface at an elevation or altitude).

Beamforming for a communication link may be performed by adjusting the signal phase (or time delay), and sometimes signal amplitude, of signals transmitted and/or received by multiple feed elements of one or more antenna assemblies 121 with overlapping native feed element patterns. In some examples, some or all feed elements may be arranged as an array of constituent receive and/or transmit feed elements that cooperate to enable various examples of on-board beamforming (OBBF), ground-based beamforming (GBBF), end-to-end beamforming, or other types of beamforming.

The satellite 120 may support multiple beamformed spot beams 125 covering respective spot beam coverage areas 126, each of which may or may not overlap with adjacent spot beam coverage areas 126. For example, the satellite 120 may support a service coverage area (e.g., a regional coverage area, a national coverage area, a hemispherical coverage area) formed by the combination of any number (e.g., tens, hundreds, thousands) of spot beam coverage areas 126. The satellite 120 may support a communications service by way of one or more frequency bands, and any number of subbands thereof. For example, the satellite 120 may support operations in the International Telecommunications Union (ITU) Ku, K, or Ka-bands, C-band, X-band, S-band, L-band, V-band, and the like.

In some examples, a service coverage area may be defined as a coverage area from which, and/or to which, either a terrestrial transmission source, or a terrestrial receiver may be participate in (e.g., transmit and/or receive signals associated with) a communications service via the satellite 120, and may be defined by a plurality of spot beam coverage areas 126. In some systems, the service coverage area for each communications link (e.g., a forward uplink coverage area, a forward downlink coverage area, a return uplink coverage area, and/or a return downlink coverage area) may be different. While the service coverage area may only be active when the satellite 120 is in service (e.g., in a service orbit), the satellite 120 may have (e.g., be designed or configured to have) a native antenna pattern that is based on the physical components of the antenna assembly 121, and their relative positions. A native antenna pattern of the satellite 120 may refer to a distribution of energy with respect to an antenna assembly 121 of a satellite (e.g., energy transmitted from and/or received by the antenna assembly 121).

In some service coverage areas, adjacent spot beam coverage areas 126 may have some degree of overlap. In some examples, a multi-color (e.g., two, three or four-color re-use pattern) may be used, wherein a "color" refers to a combination of orthogonal communications resources (e.g., frequency resources, polarization, etc.). In an example of a four-color pattern, overlapping spot beam coverage areas 126 may each be assigned with one of the four colors, and each color may be allocated a unique combination of frequency (e.g., a frequency range or ranges, one or more channels) and/or signal polarization (e.g., a right-hand circular polarization (RHCP), a left-hand circular polarization (LHCP), etc.), or otherwise orthogonal resources. Assigning different colors to respective spot beam coverage areas 126 that have overlapping regions may reduce or eliminate interference between the spot beams 125 associated with those overlapping spot beam coverage areas 126 (e.g., by scheduling transmissions corresponding to respective spot beams according to respective colors, by filtering transmissions corresponding to respective spot beams according to respective colors). These combinations of frequency and antenna polarization may accordingly be re-used in the repeating non-overlapping "four-color" re-use pattern. In some examples, a communication service may be provided by using more or fewer colors. Additionally or alternatively, time sharing among spot beams 125 and/or other interference mitigation techniques may be used. For example, spot beams 125 may concurrently use the same resources (the same polarization and frequency range) with interference mitigated using mitigation techniques such as ACM, interference cancellation, space-time coding, and the like.

In some examples, a satellite 120 may be configured as a "bent pipe" satellite. In a bent pipe configuration, a satellite 120 may perform frequency and polarization conversion of the received carrier signals before re-transmission of the signals to their destination. In some examples, a satellite 120 may support a non-processed bent pipe architecture, with phased array antennas used to produce relatively small spot beams 125 (e.g., by way of GBBF). A satellite 120 may support K generic pathways, each of which may be allocated as a forward pathway or a return pathway at any instant of time. Relatively large reflectors may be illuminated by a phased array of antenna feed elements, supporting an ability to make various patterns of spot beams 125 within the constraints set by the size of the reflector and the number and placement of the antenna feed elements. Phased array fed reflectors may be employed for both receiving uplink signals 132, 173, or both, and transmitting downlink signals 133, 172, or both.

A satellite 120 may operate in a multiple spot beam mode, transmitting or receiving according to a number of relatively narrow spot beams 125 directed at different regions of the earth. This may allow for segregation of user terminals 150 into the various narrow spot beams 125, or otherwise supporting a spatial separation of transmitted or received signals. In some examples, beamforming networks (BFN) associated with receive (Rx) or transmit (Tx) phased arrays may be dynamic, allowing for movement of the locations of Tx spot beams 125 (e.g., downlink spot beams 125) and Rx spot beams 125 (e.g., uplink spot beams 125).

User terminals 150 may include various devices configured to communicate signals with the satellite 120, which may include fixed terminals (e.g., ground-based stationary terminals) or mobile terminals such as terminals on boats, aircraft, ground-based vehicles, and the like. A user terminal 150 may communicate data and information via the satellite 120, which may include communications via an access node terminal 130 to a destination device such as a network device 141, or some other device or distributed server associated with a network 140. A user terminal 150 may communicate signals according to a variety of physical layer transmission modulation and coding techniques, including, for example, those defined by the Digital Video Broadcasting-Satellite-Second Generation (DVB-S2), Worldwide Interoperability for Microwave Access (WiMAX), cellular communication protocol such as Long-Term Evolution (LTE) or fifth generation (5G) protocol, or Data Over Cable Service Interface Specification (DOCSIS) standards.

An access node terminal 130 may service forward uplink signals 132 and return downlink signals 133 to and from satellite 120. Access node terminals 130 may also be known as ground stations, gateways, gateway terminals, or hubs. An access node terminal 130 may include an access node terminal antenna system 131 and an access node receiver 135. The access node terminal antenna system 131 may be two-way capable and designed with adequate transmit power and receive sensitivity to communicate reliably with the satellite 120. In some examples, access node terminal antenna system 131 may comprise a parabolic reflector with high directivity in the direction of a satellite 120 and low directivity in other directions. Access node terminal antenna system 131 may comprise a variety of alternative configurations and include operating features such as high isolation between orthogonal polarizations, high efficiency in the operational frequency bands, low noise, and the like.

When supporting a communications service, an access node terminal 130 may schedule traffic to user terminals 150. Alternatively, such scheduling may be performed in other parts of a communications system 100 (e.g., at one or more network devices 141, which may include network operations centers (NOC) and/or gateway command centers). Although one access node terminal 130 is shown in FIG. 1A, examples in accordance with the present disclosure may be implemented in communications systems having a plurality of access node terminals 130, each of which may be coupled to each other and/or one or more networks 140.

The satellite 120 may communicate with an access node terminal 130 by transmitting return downlink signals 133 and/or receiving forward uplink signals 132 via one or more spot beams 125 (e.g., access node spot beam 125-b, which may be associated with a respective access node spot beam coverage area 126-b). Access node spot beam 125-b may, for example, support a communications service for one or more user terminals 150 (e.g., relayed by the satellite 120), or any other communications between the satellite 120 and the access node terminal 130.

An access node terminal 130 may provide an interface between the network 140 and the satellite 120 and, in some examples, may be configured to receive data and information directed between the network 140 and one or more user terminals 150. Access node terminal 130 may format the data and information for delivery to respective user terminals 150. Similarly, access node terminal 130 may be configured to receive signals from the satellite 120 (e.g., from one or more user terminals 150) directed to a destination accessible via network 140. Access node terminal 130 may also format the received signals for transmission on network 140.

The network(s) 140 may be any type of network and can include, for example, the Internet, an internet protocol (IP) network, an intranet, a wide-area network (WAN), a metropolitan area network (MAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network(s) 140 may include both wired and wireless connections as well as optical links. Network(s) 140 may connect the access node terminal 130 with other access node terminals that may be in communication with the same satellite 120 or with different satellites 120 or other vehicles.

One or more network device(s) 141 may be coupled with the access node terminal 130 and may control aspects of the communications system 100. In various examples a network device 141 may be co-located or otherwise nearby the access node terminal 130, or may be a remote installation that communicates with the access node terminal 130 and/or network(s) 140 via wired and/or wireless communications link(s).

The communications system 100 may be configured according to various techniques that support past event signal tracking, which may be separate from a primary or real-time task or mission of the communications system 100. For example, one or more components of the communications system 100 may be configured to store received feed element signals, or other signaling that supports the formation of spot beams 125 or spot beam signals, for some duration (e.g., in a rolling buffer), and process the stored signals according to a searching or discovery beamforming configuration to generate a target spot beam signal corresponding to a target location associated with some past event or potential past event. A component of the communications system 100 may evaluate the target spot beam signal for a presence of the target signal according to various signaling hypotheses.

The generation of a searching or discovery spot beam 125 and evaluation for a presence of the target signal may be repeated, such as employing an iterative search at different locations over a same duration, or path-following at different potential locations and different time durations, or a speculative evaluation according to different signal characteristic hypotheses. Thus, the communications system 100 may support performing retroactive or iterative evaluations of stored signals to identify various signal sources, which may be beneficial in such applications as search and rescue missions, asset recovery, surveillance, crime investigation, downed pilot location, or internet of things applications, among other applications.

Figure 1B:
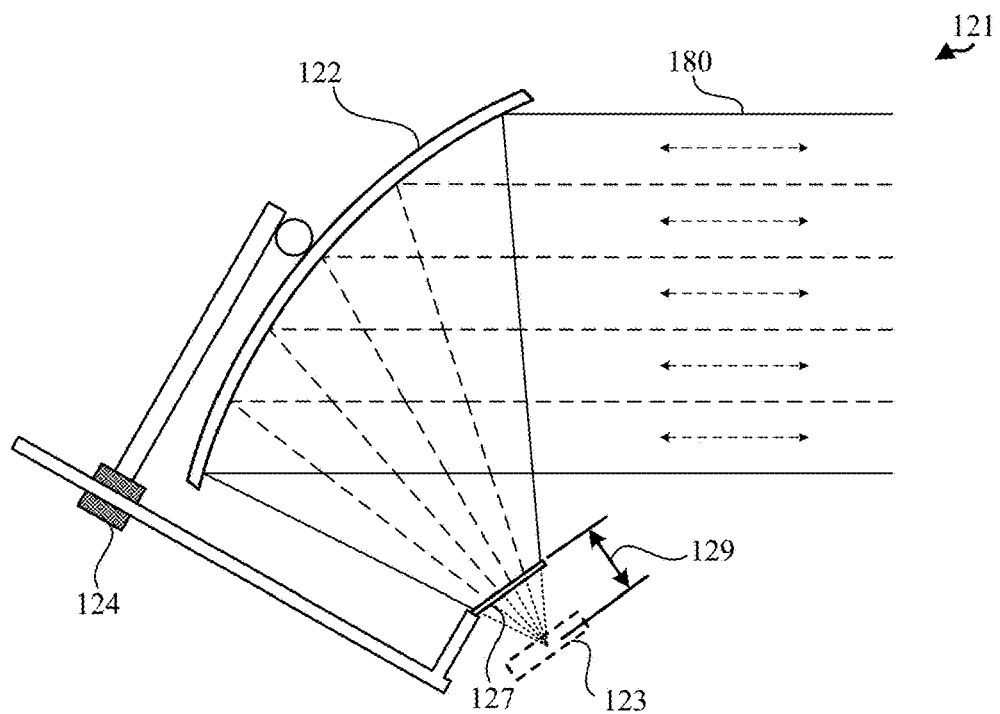
FIG. 1B illustrates an antenna assembly of a satellite that supports past event signal tracking in accordance with examples as disclosed herein.

FIG. 1B illustrates an antenna assembly 121 of a satellite 120 that supports past event signal tracking in accordance with examples as disclosed herein. As shown in FIG. 1B, the antenna assembly 121 may include a feed array assembly 127 and a reflector 122 that is shaped to have a focal region 123 where electromagnetic signals (e.g., inbound electromagnetic signals 180) are concentrated when received from a distant source. Similarly, a signal emitted by a feed array assembly 127 located at the focal region 123 will be reflected by reflector 122 into an outgoing plane wave (e.g., outbound electromagnetic signals 180). The feed array assembly 127 and the reflector 122 may be associated with a native antenna pattern formed by the composite of native feed element patterns for each of a plurality of feed elements 128 of the feed array assembly 127.

A satellite 120 may operate according to native antenna pattern of the antenna assembly 121 when the satellite 120 is in a service orbit, as described herein. The native antenna pattern may be based at least in part on a pattern of feed elements 128 of a feed array assembly 127, a relative position (e.g., a focal offset distance 129, or lack thereof in a focused position) of a feed array assembly 127 with respect to a reflector 122, etc. The native antenna pattern may be associated with a native antenna pattern coverage area. Antenna assemblies 121 described herein may be designed to support a particular service coverage area with the native antenna pattern coverage area of an antenna assembly 121, and various design characteristics may be determined computationally (e.g., by analysis or simulation) and/or measured experimentally (e.g., on an antenna test range or in actual use).

As shown in FIG. 1B, the feed array assembly 127 of the antenna assembly 121 is located between the reflector 122 and the focal region 123 of the reflector 122. Specifically, the feed array assembly 127 is located at a focal offset distance 129 from the focal region 123. Accordingly, the feed array assembly 127 of the antenna assembly 121 may be located at a defocused position with respect to the reflector 122. Although illustrated in FIG. 1B as a direct offset feed array assembly 127, a front feed array assembly 127 may be used, as well as other types of configurations, including the use of a secondary reflector (e.g., Cassegrain antenna, etc.), or a configuration without a reflector 122 (e.g., a DRA).

Figure 1C:
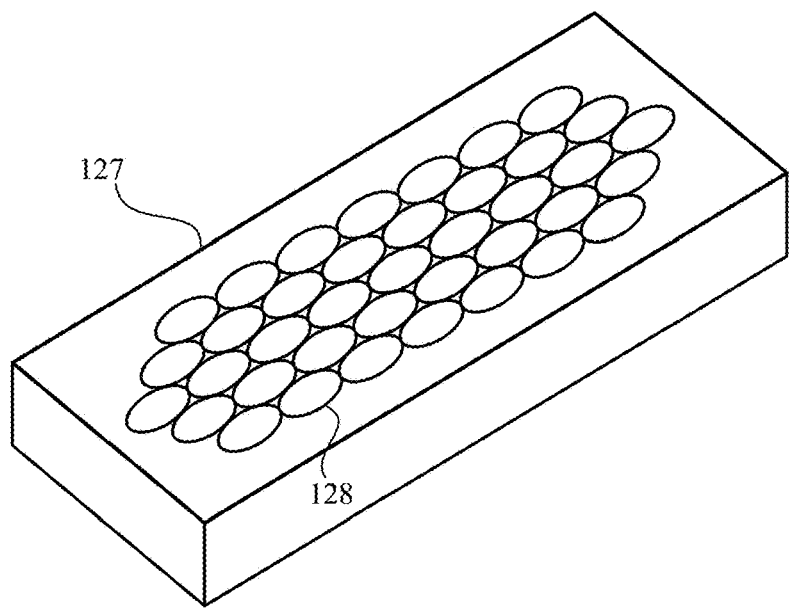
FIG. 1C illustrates a feed array assembly of an antenna assembly that supports past event signal tracking in accordance with examples as disclosed herein.

FIG. 1C illustrates a feed array assembly 127 of an antenna assembly 121 that supports past event signal tracking in accordance with examples as disclosed herein. As shown in FIG. 1C, the feed array assembly 127 may have multiple feed elements 128 for communicating signals (e.g., signals associated with a communications service, signals associated with a configuration or control of the satellite 120, received signals of a data collection or sensor arrangement).

As used herein, a feed element 128 may refer to a receive antenna element, a transmit antenna element, or an antenna element configured to support both transmitting and receiving (e.g., a transceiver element). A receive antenna element may include a physical transducer (e.g., a radio frequency (RF) transducer) that converts an electromagnetic signal to an electrical signal, and a transmit antenna element may include a physical transducer that emits an electromagnetic signal when excited by an electrical signal. The same physical transducer may be used for transmitting and receiving, in some cases.

Each of the feed elements 128 may include, for example, a feed horn, a polarization transducer (e.g., a septum polarized horn, which may function as two combined elements with different polarizations), a multi-port multi-band horn (e.g., dual-band 20 GHz/30 GHz with dual polarization LHCP/RHCP), a cavity-backed slot, an inverted-F, a slotted waveguide, a Vivaldi, a Helical, a loop, a patch, or any other configuration of an antenna element or combination of interconnected sub-elements. Each of the feed elements 128 may also include, or be otherwise coupled with an RF signal transducer, a low noise amplifier (LNA), or power amplifier (PA), and may be coupled with transponders in the satellite 120 that may perform other signal processing such as frequency conversion, beamforming processing, and the like.

A reflector 122 may be configured to reflect signals between the feed array assembly 127 and one or more target devices (e.g., user terminals 150, access node terminals 130). Each feed element 128 of the feed array assembly 127 may be associated with a respective native feed element pattern, which may be associated with a projected native feed element pattern coverage area (e.g., as projected on a terrestrial surface, plane, or volume after reflection from the reflector 122). The collection of the native feed element pattern coverage areas for a multi-feed antenna may be referred to as a native antenna pattern. A feed array assembly 127 may include any number of feed elements 128 (e.g., tens, hundreds, thousands, etc.), which may be arranged in any suitable arrangement (e.g., a linear array, an arcuate array, a planar array, a honeycomb array, a polyhedral array, a spherical array, an ellipsoidal array, or combinations thereof). Feed elements 128 may have ports or apertures having various shapes such as circular, elliptical, square, rectangular, hexagonal, and others.

FIGS. 2A through 2D illustrate examples of antenna characteristics for an antenna assembly 121-a having a feed array assembly 127-a that supports past event signal tracking in accordance with examples as disclosed herein. The antenna assembly 121-a may be operating in a condition that spreads received transmissions from a given location to a plurality of feed elements 128-a, or spreads transmitted power from a feed element 128-a over a relatively large area, or both.

Figure 2A:
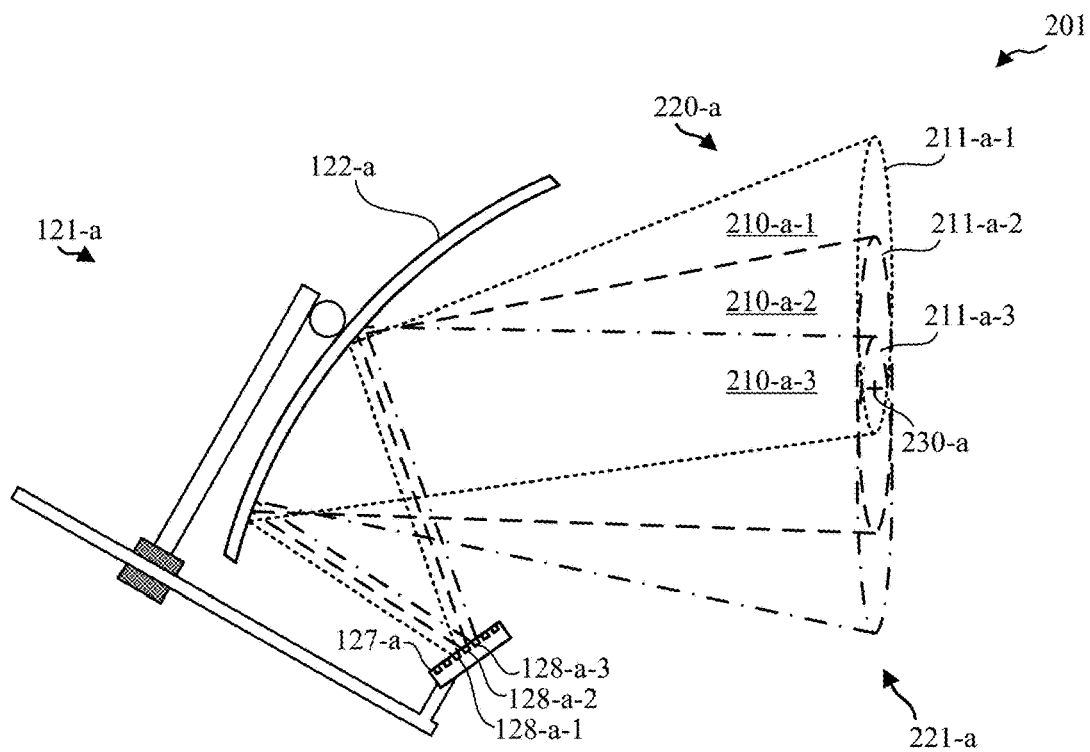
FIGS. 2A through 2D illustrate examples of antenna characteristics for an antenna assembly having a feed array assembly that supports past event signal tracking in accordance with examples as disclosed herein.

FIG. 2A shows a diagram 201 of native feed element patterns 210-a associated with feed elements 128-a of the feed array assembly 127-a. Specifically, diagram 201 illustrates native feed element patterns 210-a-1, 210-a-2, and 210-a-3, associated with feed elements 128-a-1, 128-a-2, and 128-a-3, respectively. The native feed element patterns 210-a may represent the spatial radiation pattern associated with each of the respective feed elements 128. For example, when feed element 128-a-2 is transmitting, transmitted electromagnetic signals may be reflected off the reflector 122-a, and propagate in a generally conical native feed element pattern 210-a-2 (although other shapes are possible depending on the characteristics of a feed element 128 and/or reflector 122). Although three native feed element patterns 210-a are shown for the antenna assembly 121-a, each of the feed elements 128 of an antenna assembly 121 is associated with a respective native feed element pattern 210. The composite of the native feed element patterns 210-a associated with the antenna assembly 121-a (e.g., native feed element patterns 210-a-1, 210-a-2, 210-a-2, and other native feed element patterns 210-a that are not illustrated) may be referred to as the native antenna pattern 220-a.

Each of the feed elements 128-a may also be associated with a native feed element pattern coverage area 211-a (e.g., native feed element pattern coverage areas 211-a-1, 211-a-2, and 211-a-3, associated with feed elements 128-a-1, 128-a-2, and 128-a-3, respectively), representing the projection of the native feed element patterns 210-a on a reference surface (e.g., a ground or water surface, a reference surface at an elevation, or some other reference plane or surface). A native feed element pattern coverage area 211 may represent an area in which various devices (e.g., access node terminals 130 and/or user terminals 150) may receive signals transmitted by a respective feed element 128. Additionally or alternatively, a native feed element pattern coverage area 211 may represent an area in which transmissions from various devices may be received by a respective feed element 128. For example, a device located at an area of interest 230-a, located within the native feed element pattern coverage areas 211-a-1, 211-a-2, and 211-a-3, may receive signals transmitted by feed elements 128-a-1, 128-a-2, and 128-a-3 and may have transmissions received by feed elements 128-a-1, 128-a-2, and 128-3-a. The composite of the native feed element pattern coverage areas 211-a associated with the antenna assembly 121-a (e.g., native feed element pattern coverage areas 211-a-1, 211-a-2, 211-a-2, and other native feed element pattern coverage areas 211-a that are not illustrated) may be referred to as the native antenna pattern coverage area 221-a.

The feed array assembly 127-a may be operating at a defocused position with respect to the reflector 122-a, such that the native feed element patterns 210-a, and thus the native feed element pattern coverage areas 211-a, are substantially overlapping. Therefore each position in the native antenna pattern coverage area 221-a may be associated with a plurality of feed elements 128, such that transmissions to a point of interest or receptions from a point of interest may employ a plurality of feed elements 128. It should be understood that diagram 201 is not drawn to scale and that native feed element pattern coverage areas 211 are generally each much larger than the reflector 122-a.

Figure 2B:
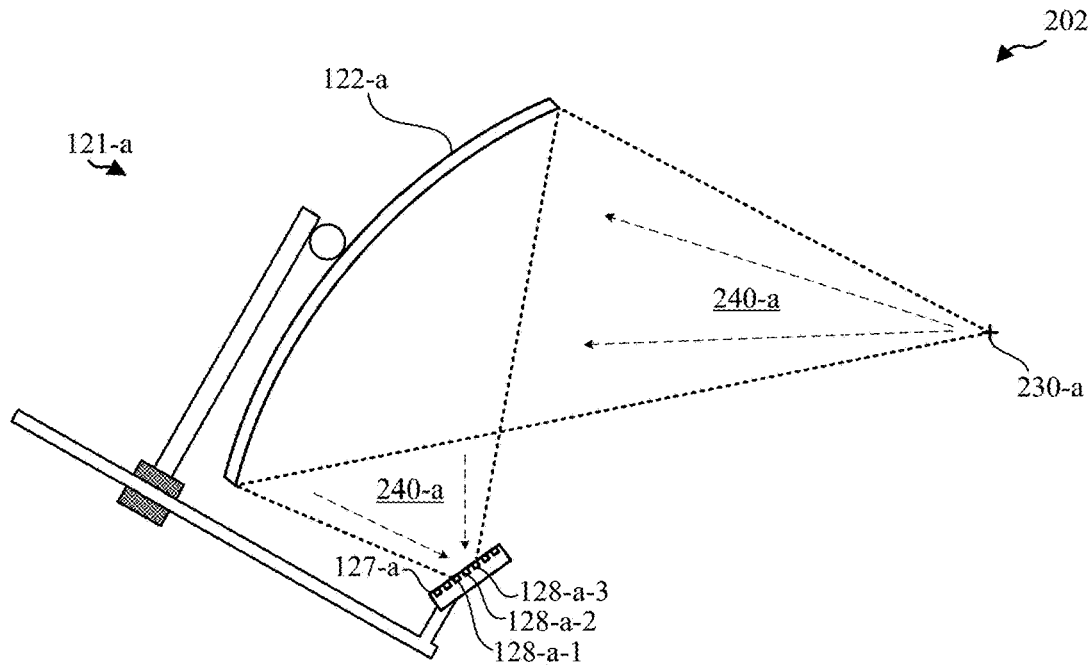

FIG. 2B shows a diagram 202 illustrating signal reception of the antenna assembly 121-a for transmissions 240-a from the point of interest 230-a. Transmissions 240-a from the point of interest 230-a may illuminate the entire reflector 122-a, or some portion of the reflector 122-a, and then be focused and directed toward the feed array assembly 127-a according to the shape of the reflector 122-a and the angle of incidence of the transmission 240 on the reflector 122-a. The feed array assembly 127-a may be operating at a defocused position with respect to the reflector 122-a, such that a transmission 240-a may be focused on a plurality of feed elements 128 (e.g., feed elements 128-a-1, 128-a-2, and 128-a-3, associated with the native feed element pattern coverage areas 211-a-1, 211-a-2, and 211-a-3, each of which contain the point of interest 230-b).

Figure 2C:
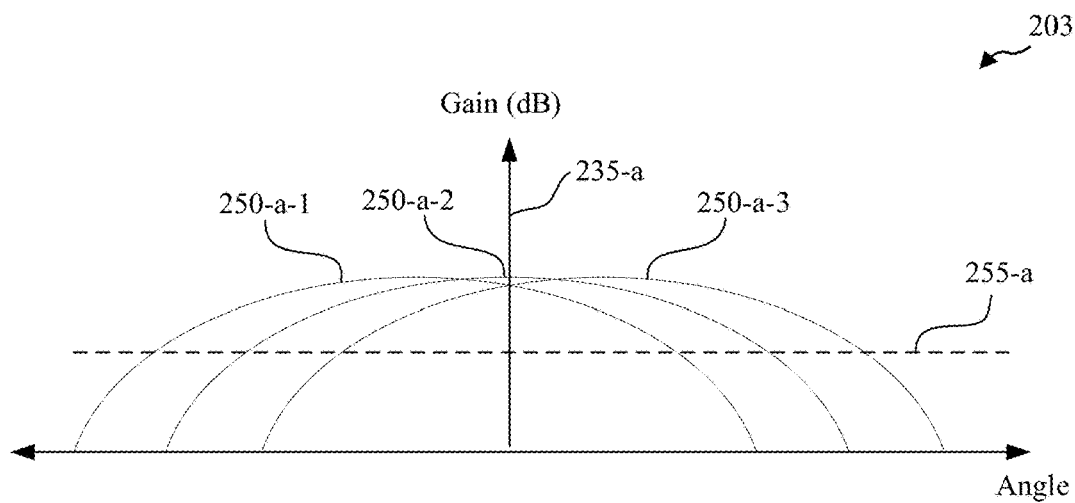

FIG. 2C shows a diagram 203 of native feed element pattern gain profiles 250-a associated with three feed elements 128-a of the feed array assembly 127-a, with reference to angles measured from a zero offset angle 235-a. For example, native feed element pattern gain profiles 250-a-1, 250-a-2, and 250-a-3 may be associated with feed elements 128-a-1, 128-a-2, and 128-a-3, respectively, and therefore may represent the gain profiles of native feed element patterns 210-a-1, 210-a-2, and 210-a-3. As shown in diagram 203, the gain of each native feed element pattern gain profile 250 may attenuate at angles offset in either direction from the peak gain. In diagram 203, beam contour level 255-a may represent a desired gain level (e.g., to provide a desired information rate) to support a communications service or other reception or transmission service via the antenna assembly 121-a, which therefore may be used to define a boundary of respective native feed element pattern coverage areas 211-a (e.g., native feed element pattern coverage areas 211-a-1, 211-a-2, and 211-a-3). Beam contour level 255-a may represent, for example, a −1 dB, −2 dB, or −3 dB attenuation from the peak gain, or may be defined by an absolute signal strength, SNR level, or SINR level. Although three native feed element pattern gain profiles 250-a are shown, other native feed element pattern gain profiles 250-a may be associated with other feed elements 128-a.

As shown in diagram 203, each of the native feed element pattern gain profiles 250-a may intersect with another native feed element pattern gain profile 250-a for a substantial portion of the gain profile above the beam contour level 255-a. Accordingly, diagram 203 illustrates an arrangement of native feed element pattern gain profiles 250 where multiple feed elements 128 of a feed array assembly 127 may support signal communication at a particular angle (e.g., at a particular direction of the native antenna pattern 220-a). In some examples, this condition may be referred to as having feed elements 128 of a feed array assembly 127, or native feed element pattern coverage areas 211, having a high degree of overlap.

Figure 2D:
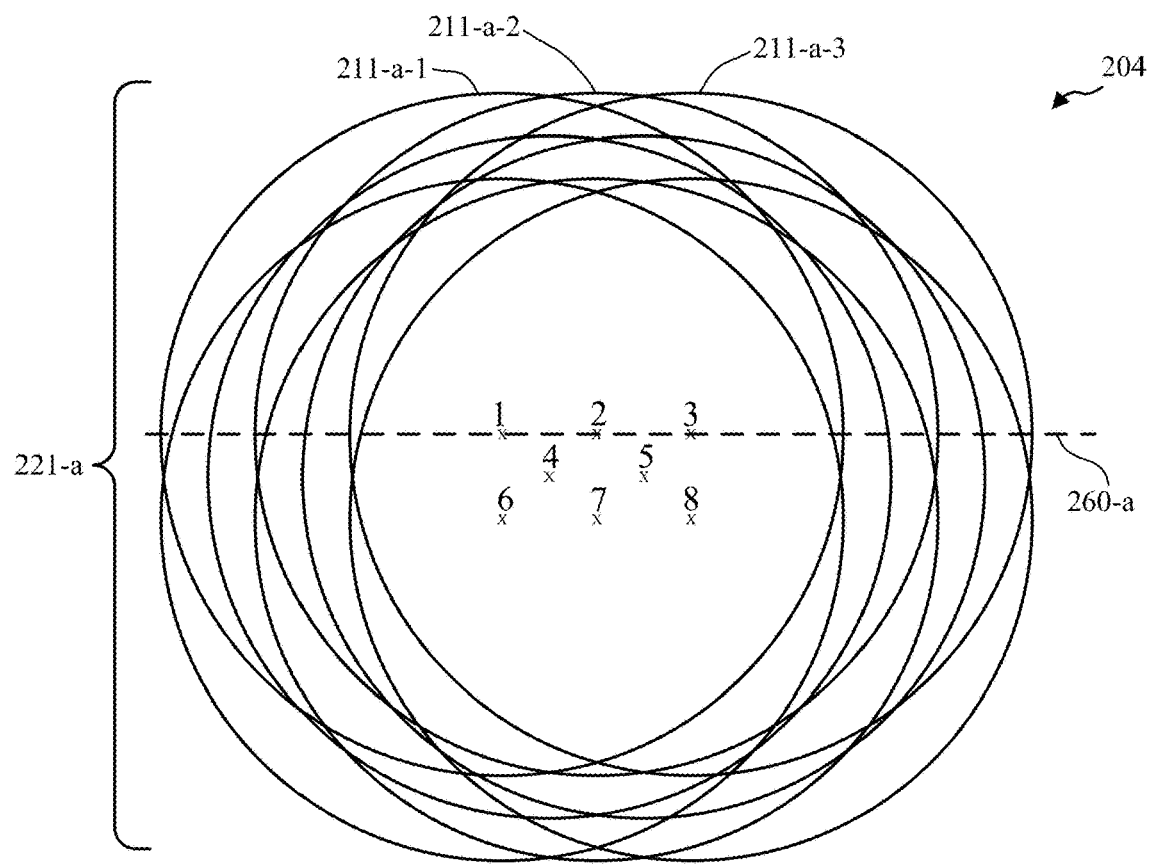

FIG. 2D shows a diagram 204 illustrating a two-dimensional array of idealized native feed element pattern coverage areas 211 of several feed elements 128 of the feed array assembly 127-a (e.g., including feed elements 128-a-1, 128-a-2, and 128-a-3). The native feed element pattern coverage areas 211 may be illustrated with respect to reference surface (e.g., a plane at a distance from the communications satellite, a plane at some distance from the ground, a spherical surface at some elevation, a ground surface, etc.), and may additionally include a volume adjacent to the reference surface (e.g., a substantially conical volume between the reference surface and the communications satellite, a volume below the reference surface, etc.). The multiple native feed element pattern coverage areas 211-a may collectively form the native antenna pattern coverage area 221-a. Although eight native feed element pattern coverage areas 211-a are illustrated, a feed array assembly 127 may have any quantity of feed elements 128 (e.g., fewer than eight or more than eight), each associated with a native feed element pattern coverage area 211.

The boundaries of each native feed element pattern coverage area 211 may correspond to the respective native feed element pattern 210 at the beam contour level 255-a, and the peak gain of each native feed element pattern coverage area 211 may have a location designated with an 'x' (e.g., a nominal alignment or axis of a respective native feed element pattern 210 or native feed element pattern coverage area 211). Native feed element pattern coverage areas 211 a-1, 211-a-2, and 211-a-3 may correspond to the projection of the native feed element patterns associated with native feed element pattern gain profiles 250-a-1, 250-a-2, and 250-a-3, respectively, where diagram 203 illustrates the native feed element pattern gain profiles 250 along section plane 260-a of diagram 204.

The native feed element pattern coverage areas 211 are referred to herein as idealized because the coverage areas are shown as circular for the sake of simplicity. However, in various examples a native feed element pattern coverage area 211 may be some shape other than a circle (e.g., an ellipse, a hexagon, a rectangle, etc.). Thus, tiled native feed element pattern coverage areas 211 may have more overlap with each other (e.g., more than three native feed element pattern coverage areas 211 may overlap, in some cases) than shown in diagram 204.

In diagram 204, which may represent a condition where the feed array assembly 127-a is located at a defocused position with respect to the reflector 122-a, a substantial portion (e.g., a majority) of each native feed element pattern coverage area 211 overlaps with an adjacent native feed element pattern coverage area 211. Locations within a service coverage area (e.g., a total coverage area of a plurality of spot beams of an antenna assembly 121) may be located within the native feed element pattern coverage area 211 of two or more feed elements 128. For example, the antenna assembly 121-a may be configured such that the area where more than two native feed element pattern coverage areas 211 overlap is maximized. In some examples, this condition may also be referred to as having feed elements 128 of a feed array assembly 127, or native feed element pattern coverage areas 211, having a high degree of overlap. Although eight native feed element pattern coverage areas 211 are illustrated, a feed array assembly 127 may have any quantity of feed elements 128, associated with native feed element pattern coverage areas 211 in a like manner.

In some cases, a single antenna assembly 121 may be used for transmitting and receiving signals between user terminals 150 or access node terminals 130. In other examples, a satellite 120 may include separate antenna assemblies 121 for receiving signals and transmitting signals. A receive antenna assembly 121 of a satellite 120 may be pointed at a same or similar service coverage area as a transmit antenna assembly 121 of the satellite 120. Thus, some native feed element pattern coverage areas 211 for antenna feed elements 128 configured for reception may naturally correspond to native feed element pattern coverage areas 211 for feed elements 128 configured for transmission. In these cases, the receive feed elements 128 may be mapped in a manner similar to their corresponding transmit feed elements 128 (e.g., with similar array patterns of different feed array assemblies 127, with similar wiring and/or circuit connections to signal processing hardware, similar software configurations and/or algorithms, etc.), yielding similar signal paths and processing for transmit and receive native feed element pattern coverage areas 211. In some cases, however, it may be advantageous to map receive feed elements 128 and transmit feed elements 128 in dissimilar manners.

A plurality of native feed element patterns 210 with a high degree of overlap may be combined by way of beamforming to provide one or more spot beams 125. Beamforming for a spot beam 125 may be performed by adjusting the signal phase or time delay, and/or signal amplitude, of signals transmitted and/or received by multiple feed elements 128 of one or more feed array assemblies 127 having overlapping native feed element pattern coverage areas 211. Such phase and/or amplitude adjustment may be referred to as applying beam weights (e.g., beamforming coefficients) to the feed element signals. For transmissions (e.g., from transmitting feed elements 128 of a feed array assembly 127), the relative phases, and sometimes amplitudes, of the signals to be transmitted are adjusted, so that the energy transmitted by feed elements 128 will constructively superpose at a desired location (e.g., at a location of a spot beam coverage area 126). For reception (e.g., by receiving feed elements 128 of a feed array assembly 127, etc.), the relative phases, and sometimes amplitudes, of the received signals are adjusted (e.g., by applying the same or different beam weights) so that the energy received from a desired location (e.g., at a location of a spot beam coverage area 126) by feed elements 128 will constructively superpose for a given spot beam coverage area 126.

The term beamforming may be used to refer to the application of the beam weights, whether for transmission, reception, or both. Computing beam weights or coefficients may involve direct or indirect discovery of communication channel characteristics. The processes of beam weight computation and beam weight application may be performed in the same or different system components. Adaptive beamformers may include a functionality that supports dynamically computing beam weights or coefficients.

Spot beams 125 may be steered, selectively formed, and/or otherwise reconfigured by applying different beam weights. For example, a quantity of active native feed element patterns 210 or spot beam coverage areas 126, a size of shape of spot beams 125, relative gain of native feed element patterns 210 and/or spot beams 125, and other parameters may be varied over time. Antenna assemblies 121 may apply beamforming to form relatively narrow spot beams 125, and may be able to form spot beams 125 having improved gain characteristics. Narrow spot beams 125 may allow the signals transmitted on one beam to be distinguished from signals transmitted on other spot beams 125 to avoid interference between transmitted or received signals, or to identify spatial separation of received signals, for example.

In some examples, narrow spot beams 125 may allow frequency and polarization to be re-used to a greater extent than when larger spot beams 125 are formed. For example, spot beams 125 that are narrowly formed may support signal communication via discontiguous spot beam coverage areas 126 that are non-overlapping, while overlapping spot beams 125 can be made orthogonal in frequency, polarization, or time. In some examples, greater reuse by use of smaller spot beams 125 can increase the amount of data transmitted and/or received. Additionally or alternatively, beamforming may be used to provide sharper gain rolloff at the beam edge which may allow for higher beam gain through a larger portion of a spot beam 125. Thus, beamforming techniques may be able to provide higher frequency reuse and/or greater system capacity for a given amount of system bandwidth.

Some satellites 120 may use OBBF to electronically steer signals transmitted and/or received via an array of feed elements 128 (e.g., applying beam weights to feed element signals at a satellite 120). For example, a satellite 120 may have a phased array multi-feed per beam (MFPB) on-board beamforming capability. In some examples, beam weights may be computed at a ground-based computation center (e.g., at an access node terminal 130, at a network device 141, at a communications service manager) and then transmitted to the satellite 120. In some examples, beam weights may be pre-configured or otherwise determined at a satellite 120 for on-board application.

In some cases, significant processing capability may be involved at a satellite 120 to control the phase and gain of each feed element 128 that is used to form spot beams 125. Such processing power may increase the complexity of a satellite 120. Thus, in some cases, a satellite 120 may operate with GBBF to reduce the complexity of the satellite 120 while still providing the advantage of electronically forming narrow spot beams 125. In some examples, beam weights or coefficients may be applied at a ground segment 102 (e.g., at one or more ground stations) before transmitting relevant signaling to the satellite 120, which may include multiplexing feed element signals at the ground segment 102 according to various time, frequency, or spatial multiplexing techniques, among other signal processing. The satellite 120 may accordingly receive and, in some cases, demultiplex such signaling, and transmit associated feed element signals via respective antenna feed elements 128 to form transmit spot beams 125 that are based at least in part on the beam weights applied at the ground segment 102. In some examples, a satellite 120 may receive feed element signals via respective antenna feed elements 128, and transmit the received feed element signals to a ground segment 102 (e.g., one or more ground stations), which may include multiplexing feed element signals at the satellite 120 according to various time, frequency, or spatial multiplexing techniques, among other signal processing. The ground segment 102 may accordingly receive and, in some cases, demultiplex such signaling, and apply beam weights to the received feed element signals to generate spot beam signals corresponding to respective spot beams 125.

In another example, a communications system 100 in accordance with the present disclosure may support various end-to-end beamforming techniques, which may be associated with forming end-to-end spot beams 125 via a satellite 120 or other vehicle operating as an end-to-end relay. For example, in an end-to-end beamforming system, beam weights may be computed at a central processing system (CPS) of a ground segment 102, and end-to-end beam weights may be applied within the ground segment 102, rather than at a satellite 120. The signals within the end-to-end spot beams 125 may be transmitted and received at an array of access nodes terminals 130, which may be satellite access nodes (SANs). Any suitable type of end-to-end relay can be used in an end-to-end beamforming system, and different types of access node terminals 130 may be used to communicate with different types of end-to-end relays.

A end-to-end beamformer within a CPS may compute one set of end-to-end beam weights that accounts for: (1) the wireless signal uplink paths up to the end-to-end relay; (2) the receive/transmit signal paths through the end-to-end relay; and (3) the wireless signal downlink paths down from the end-to-end relay. The beam weights can be represented mathematically as a matrix. In some examples, OBBF and GBBF satellite systems may have beam weight vector dimensions set by the number of feed elements 128 on an antenna assembly 121. In contrast, end-to-end beam weight vectors may have dimensions set by the number of access node terminals 130, not the number of feed elements 128 on the end-to-end relay. In general, the number of access node terminals 130 is not the same as the number of feed elements 128 on the end-to-end relay. Further, the formed end-to-end spot beams 125 are not terminated at either transmit or receive feed elements 128 of the end-to-end relay. Rather, the formed end-to-end spot beams 125 may be effectively relayed, since the end-to-end spot beams 125 may have uplink signal paths, relay signal paths (via a satellite 120 or other suitable end-to-end relay), and downlink signal paths.

Because an end-to-end beamforming system may take into account both a user link and a feeder link, as well as an end-to-end relay, only a single set of beam weights is needed to form the desired end-to-end spot beams 125 in a particular direction (e.g., forward spot beams 125 or return spot beams 125). Thus, one set of end-to-end forward beam weights results in the signals transmitted from the access node terminals 130, through the forward uplink, through the end-to-end relay, and through the forward downlink to combine to form the end-to-end forward spot beams 125. Conversely, signals transmitted from return users through the return uplink, through the end-to-end relay, and the return downlink have end-to-end return beam weights applied to form the end-to-end return spot beams 125. Under some conditions, it may be difficult or impossible to distinguish between the characteristics of the uplink and the downlink. Accordingly, formed feeder link spot beams 125, formed spot beam directivity, and individual uplink and downlink carrier to interference ratio (C/I) may no longer have their traditional role in the system design, while concepts of uplink and downlink signal-to-noise ratio (Es/No) and end-to-end C/I may still be relevant.

A communications system in accordance with examples as disclosed herein may employ various beamforming techniques to support a primary mission or real-time mission, such as real-time communications or data collection, and a secondary mission or retroactive mission, such as a past event signal tracking or other searching mission. In some examples, a satellite 120 may include an on-board beamformer configured to support a real-time mission, and the same on-board beamformer or a different on-board beamformer of the satellite 120 may be configurable to support past event signal tracking (e.g., based on feed element signals stored at the satellite 120). In some examples, a ground station of a ground segment 102 may include a ground-based beamformer configured to support a real-time mission, and the same ground-based beamformer or a different ground-based beamformer of the ground segment 102 may be configurable to support past event signal tracking (e.g., based on feed element signals stored at the ground segment 102). In some examples, a satellite 120 may include an on-board beamformer configured to support a real-time mission, and a ground station may include a ground-based beamformer configurable to support past event signal tracking (e.g., based on feed element signals stored at the satellite 120 or a ground segment). In some examples, a communications system may apply end-to-end beamforming for both a primary or real-time mission and a past event signal tracking or other searching mission. Accordingly, these and other configurations may be used to support various examples of the described techniques for past event signal tracking, which may include storing various received signaling in a manner that supports retroactively or iteratively forming target spot beams 125 or spot beam signals to search for a signal of interest or associated device.

Figure 3A:
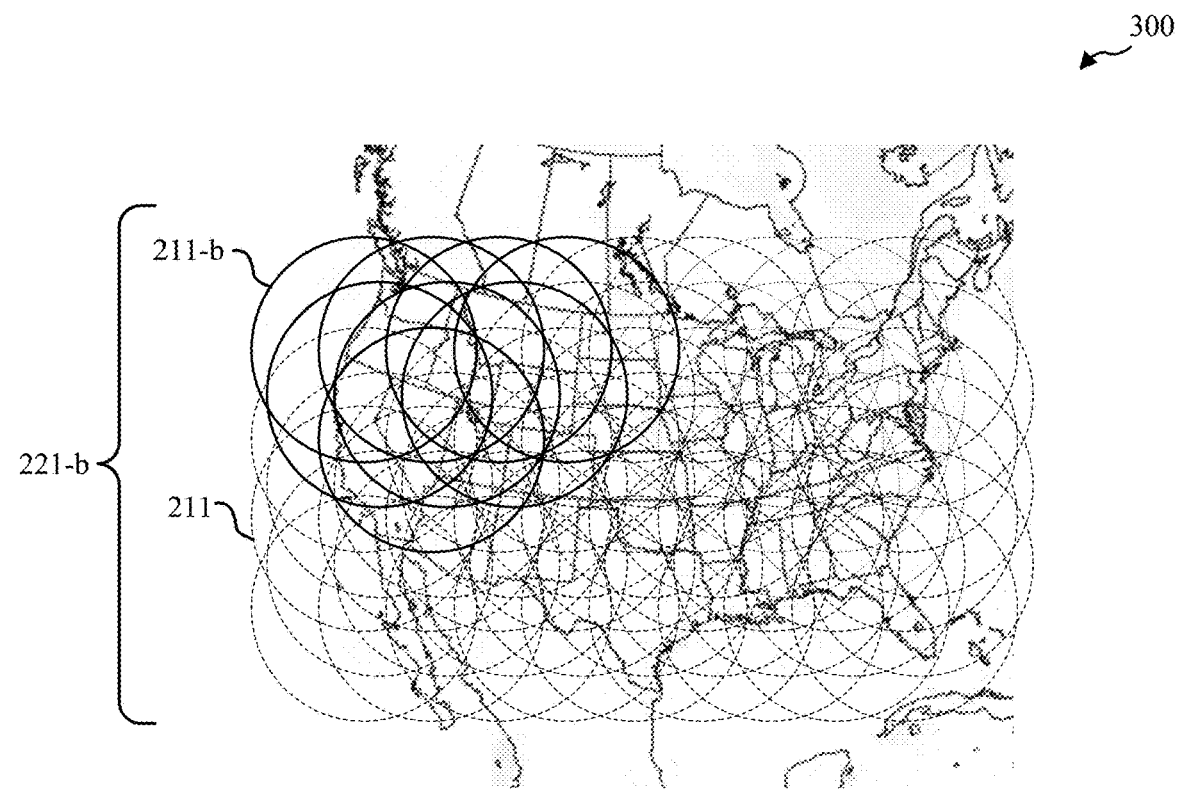
FIGS. 3A and 3B illustrate an example of beamforming to form spot beam coverage areas over a native antenna pattern coverage area in accordance with examples as disclosed herein.
Figure 3B:
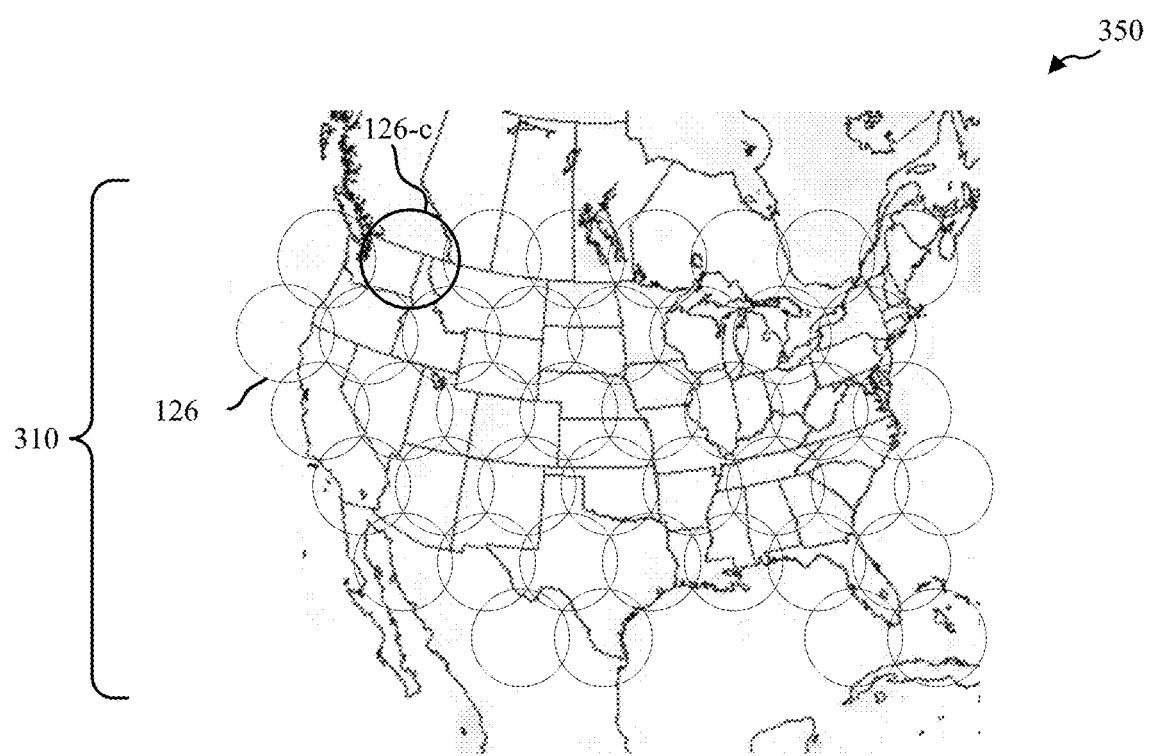

FIGS. 3A and 3B illustrate an example of beamforming to form spot beam coverage areas 126 over a native antenna pattern coverage area 221-b in accordance with examples as disclosed herein. In FIG. 3A, diagram 300 illustrates native antenna pattern coverage area 221-b that includes multiple native feed element pattern coverage areas 211 that may be provided by a defocused multi-feed antenna assembly 121. Each of the native feed element pattern coverage areas 211 may be associated with a respective feed element 128 of a feed array assembly 127 of the antenna assembly 121. In FIG. 3B, diagram 350 shows a pattern of spot beam coverage areas 126 over a service coverage area 310 of the continental United States. The spot beam coverage areas 126 may be provided by applying beamforming coefficients to signals carried via the feed elements 128 associated with the multiple native feed element pattern coverage areas 211 of FIG. 3A.

Each of the spot beam coverage areas 126 may have an associated spot beam 125 which, in some examples, may be based on a predetermined beamforming configuration configured to support a communications service or other primary or real-time mission within the respective spot beam coverage areas 126. Each of the spot beams 125 may be formed from a composite of signals carried via multiple feed elements 128 for those native feed element pattern coverage areas 211 that include the respective spot beam coverage area 126. For example, a spot beam 125 associated with spot beam coverage area 126-c shown in FIG. 3B may be a composite of signals via the eight feed elements 128 associated with the native feed element pattern coverage areas 211-b shown with dark solid lines in FIG. 3A. In various examples, spot beams 125 with overlapping spot beam coverage areas 126 may be orthogonal in frequency, polarization, and/or time, while non-overlapping spot beams 125 may be non-orthogonal to each other (e.g., a tiled frequency reuse pattern). In other examples, non-orthogonal spot beams 125 may have varying degrees of overlap, with interference mitigation techniques such as ACM, interference cancellation, or space-time coding used to manage inter-beam interference.

Beamforming may be applied to signals transmitted or received via the satellite using OBBF, GBBF, or end-to-end beamforming receive/transmit signal paths. Thus, the service provided over the spot beam coverage areas 126 illustrated in FIG. 3B may be based on the native antenna pattern coverage area 221-*b* of the antenna assembly 121 as well as beam weights applied. Although service coverage area 310 is illustrated as being provided via a substantially uniform pattern of spot beam coverage areas 126 (e.g., having equal or substantially equal beam coverage area sizes and amounts of overlap), in some examples spot beam coverage areas 126 for a service coverage area 310 may be non-uniform. For example, areas with higher population density may be provided a communications service using relatively smaller spot beams 125 while areas with lower population density may be provided the communications service using relatively larger spot beams 125.

A communications system may also be configured to support a past event signal tracking over the native antenna pattern coverage area 221-*b* of an antenna assembly 121, which may be separate from a primary or real-time task or mission over the native antenna pattern coverage area 221-*b*. For example, one or more components of a reception processing system may be configured to store received feed element signals for some duration (e.g., in a rolling buffer, corresponding to each of the native feed element pattern coverage areas 211), or, in a system that employs end-to-end beamforming, one or more components of a reception processing system may be configured to store signals received at the multiple access node terminals 130 (e.g., as relayed by a satellite 120 or other vehicle). The reception processing system may process the stored feed element signals or access node terminal signals according to a searching or discovery beamforming configuration to generate a target spot beam signal corresponding to a target location associated with some past event or potential past event. A component of the reception processing system may evaluate the target spot beam signal for a presence of the target signal according to various signaling hypotheses. The generation of a searching or discovery spot beam 125 and evaluation for a presence of the target signal may be repeated, such as employing an iterative search at different locations of the native antenna pattern coverage area 221-*b* over a same duration, or path-following at different locations of the native antenna pattern coverage area 221-*b* and different time durations, or a speculative evaluation according to different signal characteristic hypotheses.

Figure 4:
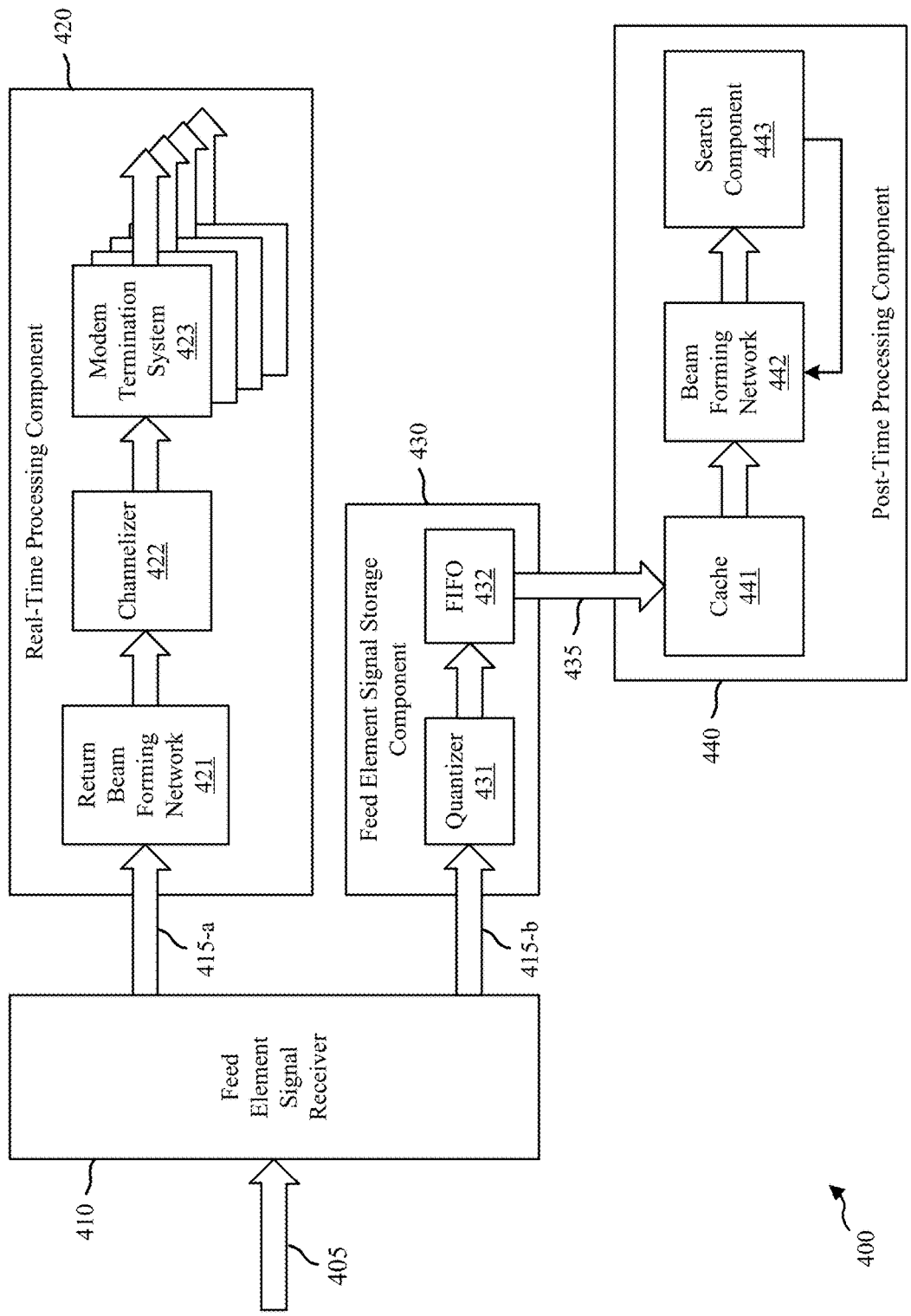
FIG. 4 illustrates an example of a reception processing system that supports past event signal tracking in accordance with examples as disclosed herein.

FIG. 4 illustrates an example of a reception processing system 400 that supports past event signal tracking in accordance with examples as disclosed herein. The reception processing system 400 includes a feed element signal receiver 410, a real-time processing component 420, a feed element signal storage component 430, and a post-time processing component 440.

The feed element signal receiver 410 may be configured to receive feed element signals 405 associated with an antenna assembly 121 having a feed array assembly 127. In some examples, the feed element signal receiver 410 may refer to a component of a satellite 120, or other vehicle including such an antenna assembly 121, that is coupled with the antenna assembly. In some examples, the feed element signal receiver 410 may refer to a component of a ground segment 102 that is separate from a device that includes such an antenna assembly 121, but is in communication with such a device (e.g., via a wireless communications link, such as a return link 133) to support the receiving of feed element signals 405. For example, the feed element signal receiver 410 may refer to a return channel feeder link downconverter of a ground segment 102, which may be a component configured to receive feed element signals 405 or other signaling for constructing receive spot beams 125 from one or more satellites 120. In some examples, the feed element signal receiver 410 may receive feed element signals by way of return links 133 via one or more ground stations, and the feed element signals 405 may be multiplexed according to various techniques, such as frequency division multiplexing, time division multiplexing, polarization multiplexing, spatial multiplexing, or other techniques. Accordingly, the feed element signal receiver 410 may be configured to demultiplex or demodulate various signaling to receive or process the feed element signals 405.

In some examples, feed element signals 405 may be received as raw signals from transducers of respective feed elements 128. In some examples, feed element signals 405 may be received as filtered or otherwise processed signals, which may include a filtering, combining, or other processing at a satellite 120 or a component of a ground segment 102. The feed element signal receiver 410 may provide feed element signals 415-*a* to the real-time processing component 420 and feed element signals 415-*b* to the feed element signal storage component 430. In some examples, the feed element signals 415-*a* and the feed element signals 415-*b* may be identical to each other, and may or may not be the same as the feed element signals 405. In some examples, to generate the feed element signals 415-*a*, the feed element signals 405 may be filtered or otherwise processed for real-time processing, which may include filtering or other processing to support frequency bands related to a primary mission, such as a communications service (e.g., filtering according to communications frequency bands). In some examples, to generate the feed element signals 415-*b*, the feed element signals 405 may be filtered or otherwise processed for post-time processing, which may include filtering or other processing that is different than a primary mission. For example, to generate the feed element signals 415-*b*, the feed element signal receiver 410 may be configured to filter the feed element signals 405 according to a wider band to support a broader range of signal discovery, or the feed element signal receiver 410 may be configured to oversample the feed element signals 405 compared to a sampling used to generate the feed element signals 415-*a*.

In some examples, a post-time search may not be configured to search for signals according to different polarizations, so the feed element signals 415-*b* may be generated by combining certain ones of feed element signals 405 corresponding to a same feed element 128, or two or more feed element 128 that share a common port or aperture, that are associated with different polarizations. In such examples, the feed element signals 415-*a* may maintain separation by polarization, which may maintain, for example, a communications signal multiplexing used by the real-time processing component 420.

The real-time processing component 420 may be configured to support a real-time or primary mission of the reception processing system 400, such as a communications service or data collection service. In the example of reception processing system 400, the real-time processing component 420 includes a return beam forming network 421, a channelizer 422, and a modem termination system 423, which may, collectively, be configured to support communications with or using a satellite 120 or other vehicle that includes an antenna assembly 121 associated with the feed element signals 405.

In some examples, the real-time processing component 420 may refer to a component of a ground segment 102 that is separate from a satellite 120 that includes an antenna assembly 121, and receives the feed element signals 415-a from a feed element signal receiver 410 of the ground segment 102 or a feed element signal receiver 410 of the satellite. For example, the return beam forming network 421 may be an example of a ground-based or end-to-end beamformer. In some examples, the real-time processing component 420 may refer to a component of a satellite 120, or other vehicle including such an antenna assembly 121, that is coupled with the antenna assembly 121. For example, the return beamforming network may be an example of an on-board beamformer coupled with the feed element signal receiver 410 of the satellite 120 and configured to receive feed element signals 415-a via a signal path of the satellite 120.

The return beam forming network 421 may be configured to process the feed element signals 415-a by applying beam weights or coefficients to generate spot beam signals. The spot beams 125 formed by the return beam forming network 421 may refer to predetermined beams having substantially non-overlapping spot beam coverage areas 126, and for a given location, may use different frequency bands, polarizations, or both. The generated spot beam signals may be processed through the channelizer 422 and modem termination system 423 to support various return link communications.

In addition to supporting the operations of the real-time processing component 420 (e.g., a primary mission), the reception processing system 400 may also be configured to sample and store feed element signals 405 or other related signaling for later processing (e.g., beam reconstruction for past event searching). For example, the feed element signal storage component 430 may be configured to receive feed element signals 415-b, optionally process the received signals using a quantizer 431, and store the feed element signals 415-b in a first-in-first-out (FIFO) component 432. The FIFO component 432 may include a physical storage component configured to store the feed element signals 415-b over a duration that supports a desired look-back window or duration. The feed element signal storage component 430 may be configured to provide stored feed element signals 435 to the post-time processing component 440, which may support various operations that are performed in parallel with or concurrently with those operations performed by the real-time processing component 420 (e.g., without interrupting the real-time processing component 420).

In one example, the FIFO component 432 may be configured to support a look-back window of 30 days for feed element signals 405 that are sampled at a bandwidth of 34.0 MHz. When applying an oversampling factor of 6 (e.g., at the feed element signal receiver 410 or the quantizer 431), a sampling rate of data stored at the FIFO component 432 may be 204,000,000 samples per second. When the feed element signals 405 correspond to a feed array assembly 127 having one hundred forty five feed elements 128, and a quantization of 4 bits per sample, the FIFO component 432 may support an input speed or rate of 118.32 Gbps. To support a look-back window of 30 days, the FIFO component 432 may accordingly include a storage capacity of at least 35.56 Terabytes.

The post-time processing component 440 may be configured to support a search or discovery mission of the reception processing system 400, such as an iterative search for a signal of interest within a service coverage area 310 or native antenna pattern coverage area 221 corresponding to the feed element signals 405 or feed element signals 415-b, or stored feed element signals 435. In accordance with various techniques, the post-time processing component 440 may support iterative processing for performing a spatial search for any signal feature in view of the corresponding antenna assembly 121. With the support of the feed element signal storage component 430, detected signals (e.g., as stored at the feed element signal storage component 430, as held in a cache 441) can be iteratively demodulated and decoded. In the example of reception processing system 400, the post-time processing component 440 includes a cache 441, a beam forming network 442, and a search component 443.

In some examples, the post-time processing component 440 may refer to a component of a ground segment 102 that is separate from a satellite 120 that includes an antenna assembly 121, and receives the stored feed element signals 435 of the same component of the ground segment 102, or one or more other components of the ground segment 102. For example, the beam forming network 442 may be an example of a ground-based or end-to-end beamformer (e.g., of a ground-based hub or feeder station). In some examples, the post-time processing component 440 may refer to a component of a satellite 120 or other vehicle that includes an antenna assembly 121 associated with the feed element signals 415-b. For example, the beam forming network 442 may be an example of an on-board beamformer.

The beam forming network 442 may be configured to process the stored feed element signals 435 (e.g., as transferred to and maintained in the cache 441) by applying beam weights or coefficients to generate target spot beam signals associated with an iterative search or signal discovery. The spot beams 125 formed by the beam forming network 442 may refer to speculative or hypothetical spot beams 125, and may be based on a predicted location or path of a device associated with a signal of interest, or may be based on a random or iterative location sweep (e.g., when location or path information is not known). The generated spot beam signals may be processed through the search component 443, which may be configured to perform various evaluations of a presence or absence of a signal of interest.

The beam forming network 442 may support forming any spot beam 125 possible with the stored feed element signals 435, and therefore may not be limited to the spot beam configurations of the return beam forming network 421. For example, the beam forming network 442 may be configured to generate smaller spot beams 125 for greater directionality or location resolution, or spot beams 125 with higher gains to support distinguishing signals from each other. The operations of the beam forming network 442 may be performed without affecting a primary mission (e.g., without interrupting operations of the return beam forming network 421), and may support looking back in time, at different locations, and with different granularity. In some examples, a spot beam 125 generated by the beam forming network 442 may have a different location or a different shape than the spot beams 125 generated by the return beam forming network 421, and the beam forming network 442 may be configured to support sweeping a spot beam 125 through given locations at a given window of time of the stored feed element signals 435. The search component 443 may support various functionality to detect, characterize, demodulate, and decode spot beam signals generated by the beam forming network 442 over a post-time search window.

Although certain techniques for past event signal tracking are described in the context of storing and processing feed element signals, the described techniques may be applied to any signaling that supports a post-event reconstruction of target spot beams 125 or corresponding spot beam signals. For example, in an end-to-end beamforming configuration, return uplink signals associated with some quantity of spot beam coverage areas 126 may be received according to an array of receive/transmit signal paths, which may each correspond to a respective receive feed element 128 and a respective transmit feed element 128 of a relay device. The return uplink signals may be transmitted by the transmit feed elements 128 of the relay device, and transmitted signals of at least a subset of the transmit feed elements 128 may be received at each of a plurality of access node terminals 130. The respective return uplink signals as received at the plurality of access node terminals 130 may forwarded to a CPS of the end-to-end beamforming system and processed (e.g., by applying a beam weight matrix to the received signals) to generate spot beam signals corresponding to the spot beam coverage areas 126. Thus, the respective return uplink signals of an end-to-end beamforming system, as received at respective access node terminals 130 or as received at a CPS, may support both a primary or real-time mission and a post-event or other searching mission even when such signaling is not divided or multiplexed according to single ones of the feed elements 128. In other words, the described techniques for post event signal tracking are not limited to the reception and storage of signals that each correspond to a single feed element 128. Rather, the described techniques for post event signal tracking may implement any signaling that may be stored and later processed to construct a spot beam 125 or corresponding spot beam signal.

Figure 5:
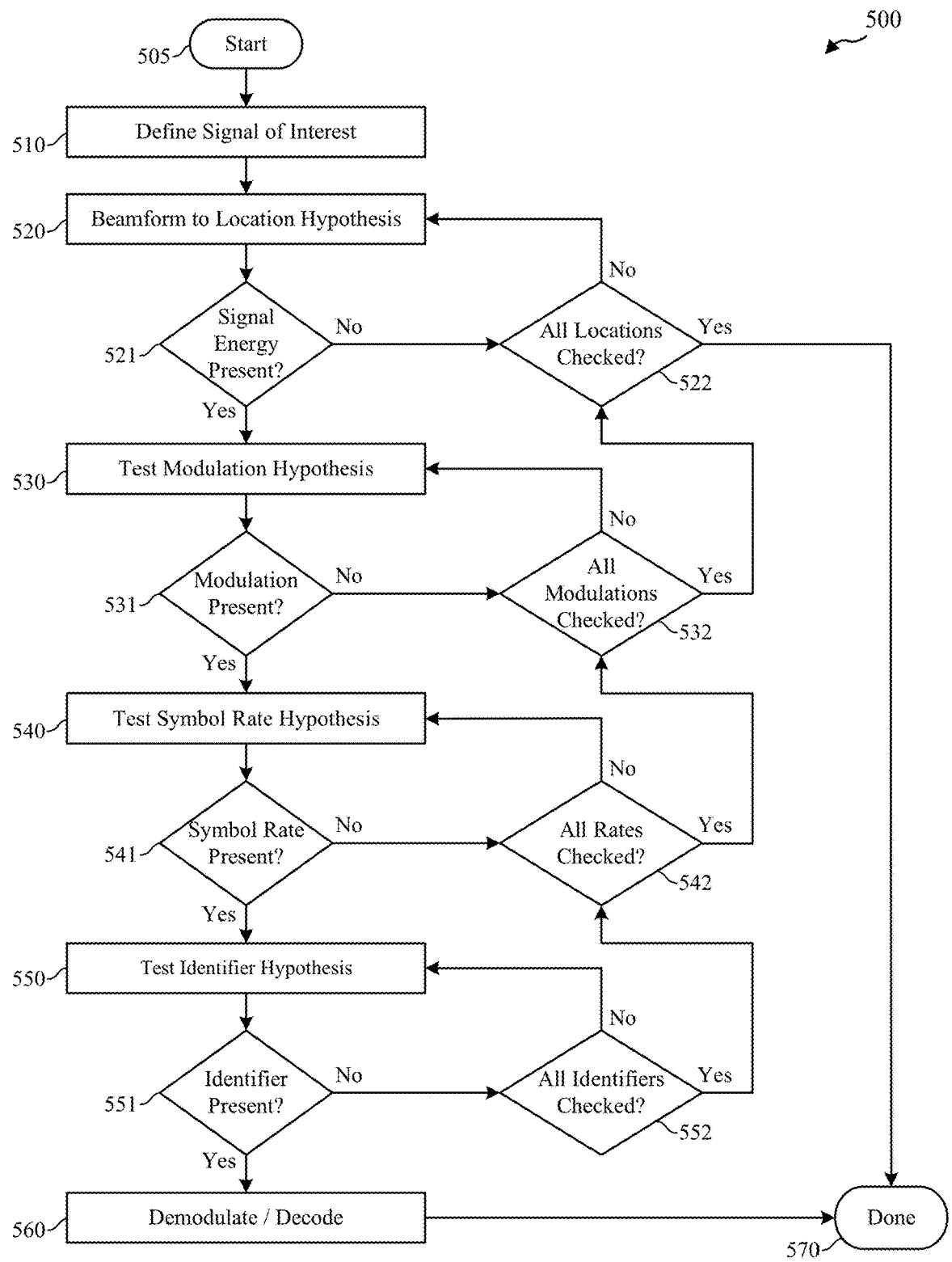
FIG. 5 illustrates an example of a search process that supports past event signal tracking in accordance with examples as disclosed herein.

FIG. 5 illustrates an example of a search process 500 that supports past event signal tracking in accordance with examples as disclosed herein. The search process 500 may be performed by one or more components of a post-time processing component, such as post-time processing component 440 described with reference to FIG. 4. The search process 500 illustrates an example of an iterative processing that supports a spatial search for any signal feature within a service coverage area of one or more antenna assemblies 121.

At 505, the search process 500 may begin. In various examples, the search process 500 may begin based on a user initiation or intervention, or based on an event-driven initiation (e.g., a loss of an expected signal, a movement of a target device outside a threshold range, location, or path, an alarm-driven initiation). In some examples, the search process 500 may begin as part of a search and rescue operation, a recovery operation, a surveillance operation, or a crime investigation operation, among others.

At 510, the search process 500 may include defining a signal of interest. In some examples, characteristics of a signal of interest may be known to a user, and provided as an input to the search process 500. In some examples, aspects of a signal of interest may be known to a component of a reception processing system performing the search process 500, including information that may be stored in and retrieved from a lookup table or other reference resource. A signal of interest may have characteristics such as a modulation scheme, a symbol rate, an identifier, among others, and such characteristics may be known before starting the search process 500, or may be known or expected to be one of a set of possibilities before starting the search process 500.

At 520, the search process 500 may include beamforming (e.g., receive beamforming) a set of stored feed element signals to a location hypothesis, which may be associated with generating a target spot beam signal based at least in part on the beamforming. The stored feed element signals may have been received from a single antenna assembly 121, or from more than one antenna assembly 121 (e.g., from a set of satellites 120). In some examples, an initial location hypothesis may be based at least in part on a predicted location of a device associated with the signal of interest. For example, an initial location hypothesis may be based on a last known position of a device associated with the signal of interest, or based on a known or predicted path of a device associated with the signal of interest. The beamforming at 520 may be performed by a beam forming network, such as a beam forming network 442 of a post-time processing component 440, which may be the same as or different than a beamforming network used in a primary mission (e.g., a return beam forming network 421 of a real-time processing component 420). Further, the beamforming at 520 may involve a spot beam 125 having the same or different characteristics as a spot beam 125 related to a real-time mission. For example, the beamforming at 520 may involve a spot beam 125 having a wider or narrower spot beam coverage area 126, or a spot beam 125 having a target location (e.g., a spot beam center or axis, which may or may not be aligned with the location hypothesis) that is different than the spot beams 125 of a real-time mission.

At 521, the search process 500 may include evaluating whether signal energy is present in the spot beam signal associated with the location hypothesis. The evaluation at 521 may include an evaluation of signal energy at a frequency or frequency range expected for the target signal, or based on a polarization expected for the target signal, or various combinations thereof. If signal energy is present the search process 500 may proceed to 530, and if signal energy is not present the search process 500 may proceed to 522, where the search process 500 may include evaluating if all locations of interest in a service coverage area have been checked. If not all locations have been checked the search process 500 may return to 520 to beamform to a next location hypothesis (e.g., generate a new target spot beam signal for the next location hypothesis), and if all locations of interest have been checked the search process 500 may proceed to 570 to conclude the search process.

At 530, the search process 500 may include testing a modulation hypothesis. In some examples, an initial modulation hypothesis may include a modulation scheme expected for the signal of interest, such as one of binary phase shift keying (BPSK), quadrature phase shift keying (QPSK), quadrature amplitude modulation (QAM), or some other modulation scheme. In some examples, a particular modulation scheme may not be known or expected, and an initial modulation hypothesis may be selected randomly or according to a defined iteration sequence. Testing a modulation hypothesis may include various evaluations of the target spot beam signal (e.g., as generated at 520), such as evaluating frequency, amplitude, or phase characteristics of the target spot beam signal relative to the characteristics that may be expected for the hypothetical modulation scheme. In some examples, such an evaluation may be performed based on a pilot signal identified in the target spot beam signal.

At 531, the search process 500 may include evaluating whether the hypothetical modulation scheme is present in the target spot beam signal. The evaluation at 531 may include an evaluation of whether a frequency, amplitude, and/or phase of the spot beam signal matches one or more points or patterns of a constellation of modulation symbols associated with the hypothetical modulation scheme. If the modulation scheme is present the search process 500 may proceed to 540, and if the modulation scheme is not present the search process 500 may proceed to 532, where the search process 500 may include evaluating if all the modulation schemes in a set of possibilities have been checked. At 532, if not all the modulation schemes have been checked the search process 500 may return to 530 to evaluate a next modulation scheme, and if all the modulation schemes have been checked the search process 500 may return to 522 to evaluate whether to beamform at a next location hypothesis (e.g., to generate a new target spot beam signal for the next location hypothesis).

At 540, the search process 500 may include testing a symbol rate hypothesis. In some examples, an initial symbol rate hypothesis may include a symbol rate expected for the signal of interest, which may be associated with a communications or signaling bandwidth supported by a device associated with the signal of interest. In some examples, a particular symbol rate may not be known or expected, and an initial symbol rate may be selected randomly or according to a defined iteration sequence. Testing a symbol rate may include various evaluations of the target spot beam signal (e.g., as generated at 520), such as evaluating how often amplitude or phase characteristics of the target spot beam signal change (e.g., how often a new modulation symbol is represented) relative to the characteristics that may be expected for the hypothetical symbol rate, or otherwise tuning signal processing to a hypothetical symbol rate.

At 541, the search process 500 may include evaluating whether the symbol rate is present in the target spot beam signal. The evaluation at 541 may include evaluating whether the rate of changes or transitions of phase and/or amplitude matches the hypothetical symbol rate, or evaluating whether decoding at a hypothetical symbol rate is successful. If the symbol rate is present the search process 500 may proceed to 550, and if the symbol rate is not present the search process 500 may proceed to 542, where the search process 500 may include evaluating if all the symbol rates in a set of possibilities have been checked. At 542. if not all the symbol rates have been checked the search process 500 may return to 540 to evaluate a next symbol rate, and if all the symbol rates have been checked the search process 500 may return to 532 to evaluate whether to test another modulation hypothesis.

At 550, the search process 500 may include tuning to an identifier hypothesis. In some examples, an initial identifier hypothesis may include an identifier expected for the signal of interest, which may be associated with an identifier of a device associated with the signal of interest, such as a device identifier, a vehicle identifier, a device signature or address, among others. For example, the target spot beam signal may be evaluated for a confirmation that the received signaling includes transmissions made by a target device associated with the signal of interest. In some examples, a particular identifier may not be known or expected, and an initial identifier may be selected randomly or according to a defined iteration sequence. Testing an identifier may include various evaluations of the target spot beam signal (e.g., as generated at 520), such as evaluating pilot signals or symbols, demodulating or decoding the target spot beam signal for signals of control information or other information, among other evaluations relative to the identifier characteristics that may be expected for the identifier hypothesis.

At 551, the search process 500 may include evaluating whether the identifier is present in the target spot beam signal. The evaluation at 551 may include evaluating whether a detected identifier matches the hypothetical identifier. If the identifier is present the search process 500 may proceed to 560, and if the identifier is not present the search process 500 may proceed to 552, where the search process 500 may include evaluating if all the identifiers in a set of possibilities have been checked. If not all the identifiers have been checked the search process 500 may return to 550 to evaluate a next identifier, and if all the identifiers have been checked the search process 500 may return to 542 to evaluate whether to test another symbol rate hypothesis.

At 560, the search process 500 may include demodulating and/or decoding the processed signaling (e.g., of the target spot beam signal generated at 520). The demodulation and/or decoding may support extracting information from the target spot beam signal, which may include various information relevant to a target device associated with the signal of interest. For example, the operations at 560 may include demodulating or decoding information relevant to positioning information, operational information, or diagnostic information, among others. After the operations of 560, the search process may proceed to 570 and conclude. In some examples, the operations of 560 may be omitted, and the search process 500 may proceed from 550 to 570 without demodulating or decoding the processed signaling.

At 570, the search process 500 may conclude. In some examples, concluding the search process 500 may include an indication that the signal of interest was not found, and the search process 500 may or may not be performed again with a modified definition of a signal of interest. In some examples, concluding the search process 500 may include a confirmation that the signal of interest, or a device associated with the signal of interest, was found at the location hypothesis. In some examples, concluding the search process 500 may include an output of information demodulated or decoded at 560, which may be relevant to various search operations such as search and rescue operations, asset recovery operations, surveillance operations, or crime investigation operations, among others.

Figure 6:
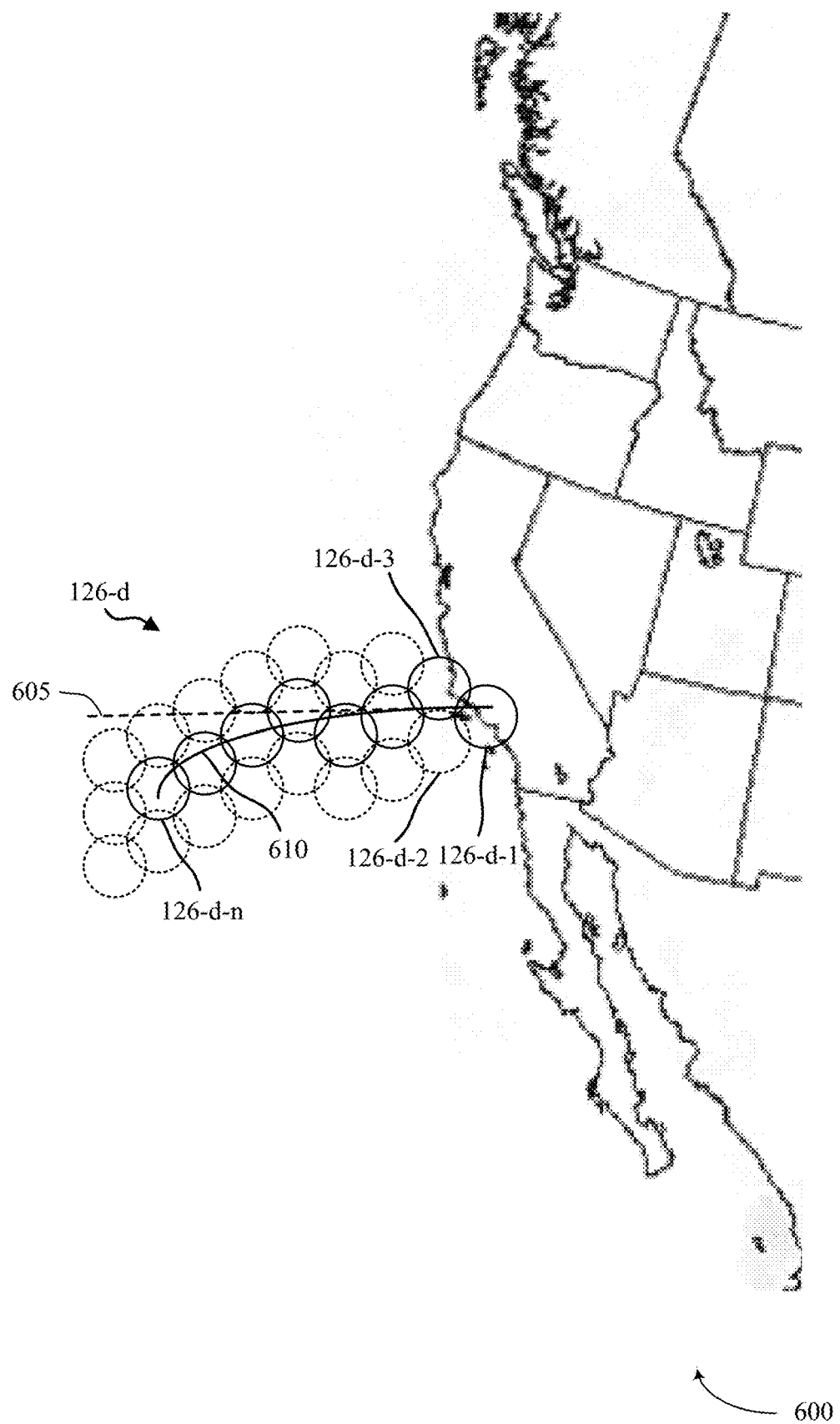
FIG. 6 illustrates an example of a past event signal tracking in accordance with examples as disclosed herein.

FIG. 6 illustrates an example of a past event signal tracking 600 in accordance with examples as disclosed herein. The past event signal tracking 600 may illustrate an example where an aircraft was intended to follow a hypothetical path 605, but lost communications connectivity. To identify a possible location of a downed aircraft, the past event signal tracking 600 may refer to a post-event analysis that includes aspects of the search process 500 in accordance with a set of target spot beam coverage areas 126-d.

The target spot beam coverage areas 126-d may refer to respective areas over which received signal energy can be isolated from other areas by way of a post-event receive beam forming (e.g., using a beam forming network 442). For example, each of the target spot beam coverage areas 126-d may be associated with respective spot beam 125 formed from stored feed element signals 435, which may correspond to a plurality of native feed element patterns 210 of a native feed element pattern coverage area 221 that includes the areas illustrated by target spot beam coverage areas 126-d. The stored feed element signals 435 may be associated with feed element signaling (e.g., feed element signals 405) that also supported a real-time mission, such as providing internet connectivity over a service coverage area 310. In some examples, the target spot beam coverage areas 126-d may be the same as or similar to spot beam coverage areas 126 associated with a real-time mission. In some examples, the target spot beam coverage areas 126-d may be different than spot beam coverage areas 126 associated with a real-time mission, which may include target spot beam coverage areas 126-d having a smaller or larger size (e.g., diameter), different locations, different numbers of beams, or different gains than the spot beam coverage areas 126 of a primary mission.

A post-time mission request in such a scenario may include a request to locate the subject aircraft or identify information signaling from the subject aircraft. To support such a mission, the search process 500 may be used to form high-gain target spot beams 125 (e.g., each corresponding to a respective target spot beam coverage area 126-*d*) from stored feed element signals 435 that were stored at a storage component (e.g., a feed element signal storage component 430) for later analysis. In various examples, the subject aircraft may or may not have been participating in communications with the related satellite communications system. Rather, a process such as the search process 500 may be performed without the subject aircraft having participated in communications via the feed elements associated with the feed element signals used in a search process of past event signal tracking 600.

Performing a search process in the past event signal tracking 600, such as search process 500, may be based on the hypothetical path 605 (e.g., including target spot beam coverage areas 126-*d* that overlap the hypothetical path 605), but may also include surrounding target spot beam coverage areas 126-*d* to evaluate whether the aircraft deviated from the hypothetical path 605. For example, the search process may begin with an initial spot beam 126-*d*-1 (e.g., a target location hypothesis or last known location) and a first time window. If the target signal is detected in the stored signals (e.g., feed element signals, access node terminal signals) for the first time window using beamforming weights corresponding to the initial spot beam 126-*d*-1, then the search process may continue by searching for the target signal in neighboring spot beams (e.g., including spot beams 126-*d*-2 and 126-*d*-3) at a second time window subsequent to the first time window. For example, each of spot beams 126-*d*-2 and 126-*d*-3 may correspond to different beamforming weight sets applied to the stored signals. In the illustrated example, the target signal is found in spot beam 126-*d*-3 for the second time window.

The search process may continue and result in determining a detected path 610 (e.g., based on detecting signaling in the target spot beam coverage areas 126-*d* illustrated with solid lines of a number of searched spot beam coverage areas 126-*d* including the spot beam coverage areas 126-*d* illustrated with dashed lines), which may provide an estimation of a location versus time for the subject aircraft, or an identification of a last target spot beam coverage area 126-*d* in which signaling was detected (e.g., identifying a possible downed aircraft within the target spot beam coverage area 126-*d*-*n*). In some example, results of the search process (e.g., based on demodulating or decoding target spot beam signaling or the search process) may include identifying engine telemetry of the aircraft, determining an actual path of the aircraft, demodulating telemetry information, and possibly identifying a cause of failure of the aircraft. While performing a search process for the past event signal tracking 600, a real-time mission supported by the feed elements that provided the stored information may be unaffected, and feed element signal recording may continue.

Although the described techniques for past event signal tracking may be applicable to electromagnetic signaling via an antenna assembly 121, in some examples, the described techniques for past event searching may be applied to optical signals. For example, imaging information from a plurality of cameras or optical sensors may be stored separately, but combined according to various optical focusing or other processing techniques. In one example, phased array optical sensors may be employed where individual element data is stored, and later used to focus an image using post-processing techniques similar to those described herein with relation to antennas and electromagnetic signal processing.

Figure 7:
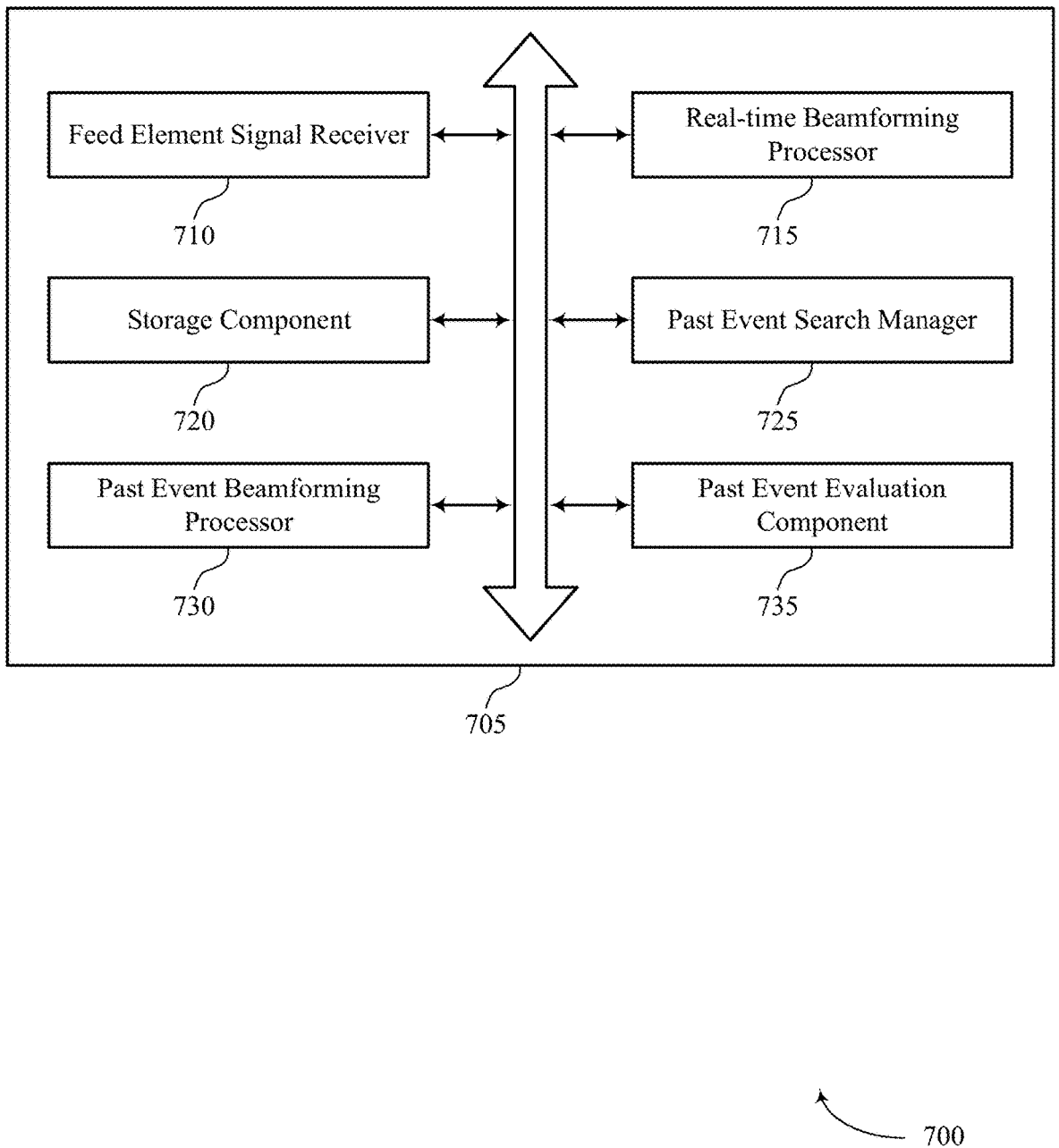
FIG. 7 shows a block diagram of a reception processing system that supports past event signal tracking in accordance with examples as disclosed herein.

FIG. 7 shows a block diagram 700 of a reception processing system 705 that supports past event signal tracking in accordance with examples as disclosed herein. The reception processing system 705 may be an example of aspects of a communications system or reception processing system as described with reference to FIGS. 1A through 5. The reception processing system 705 may include a feed element signal receiver 710, a real-time beamforming processor 715, a storage component 720, a past event search manager 725, a past event beamforming processor 730, and a past event evaluation component 735. Each of these modules may communicate, directly or indirectly, with one another (e.g., via one or more buses or other communications links). In some examples, the reception processing system 705 may refer to or otherwise include components of a ground segment 102 of a communications system 100, or the reception processing system 705 may refer to or otherwise include components of a satellite 120 of a communications system 100. In some examples, components of the reception processing system 705 may be distributed between a ground segment 102 and a space segment 101, or other antenna system (e.g., an overhead antenna system, such as an antenna system of a plane or UAV), supporting beamformed reception and feed element signal storage.

The feed element signal receiver 710 may be configured to receive a set of feed element signals. In some examples, each feed element signal of the set may correspond to a respective one of a set of feed elements 128 of a feed array assembly 127 of an antenna assembly 121, which may be associated with a service coverage area 310 or a native antenna pattern coverage area 221. In some examples, the feed element signal receiver 710 may be configured to receive a second set of feed element signals, each feed element signal of the second set corresponding to a respective one of a second set of feed elements 128 of a feed array assembly 127 of a second antenna assembly 121 (e.g., a different antenna), which may be associated with a second service coverage area 310 or a second native antenna pattern coverage area 221. In various examples, the first antenna assembly 121 and the second antenna assembly 121 may be components of the same device, or components of different devices (e.g., different satellites 120, different vehicles).

In some examples, the feed element signal receiver 710 may be a component of a ground station of a ground segment 102, or the features of the feed element signal receiver 710 may be distributed across a plurality of ground stations of a ground segment 102. For example, the reception processing system 705 may be configured to receive the set of feed element signals at or otherwise using a set of ground stations of a ground segment 102. In some examples, the feed element signal receiver 710 may include a component of a network device 141 or other central processing component of a ground segment 102. In some examples, the feed element signal receiver 710 may refer to or be otherwise associated with components of one or more satellites 120.

The real-time beamforming processor 715 may be configured to process a set of feed element signals according to a first beamforming configuration (e.g., a primary beamforming configuration associated with a set of spot beams 125, a real-time beamforming configuration associated with a set of spot beams 125) to generate one or more spot beam signals. Each of the spot beam signals may correspond to a respective spot beam 125 (e.g., of an antenna assembly 121), and may include communications scheduled for transmission or reception via respective ones of the set of spot beams 125. In various examples, the real-time beamforming processor 715 may include a component of a ground segment 102 (e.g., an access node terminal 130 or a network device 141, to support ground-based beamforming of a primary or real-time mission or task), or the real-time beamforming processor 715 may include a component of a satellite 120 (e.g., to support on-board beamforming of a primary or real-time mission or task), which may or may not be the same satellite 120 that includes the antenna assembly 121 associated with the feed elements 128 of the feed element signals.

The storage component 720 may store feed element signals over a duration. In some examples, the storage component 720 may include a FIFO buffer that stores feed element signals over a moving time window (e.g., a period of hours, a period of days, a period of weeks, a period of months, and so on). In some examples, the storage component 720 may oversample the received set of feed element signals relative to a bandwidth of the received set of feed element signals. In some examples, the storage component 720 may include a component of a ground station of a ground segment 102, or the features of the storage component 720 may be distributed across a plurality of ground stations of a ground segment 102. For example, the reception processing system 705 may be configured to store feed element signals at or otherwise using a set of ground stations of a ground segment 102. In some examples, the storage component 720 may be a component of a network device 141 or other central processing component of a ground segment 102. Additionally or alternatively, in some examples, the storage component 720 may refer to components of one or more satellites 120 or other vehicles that store feed element signals locally.

The past event search manager 725 may be configured to determine to search for a target signal from a location within a service coverage area 310 or native antenna pattern coverage area 221, and at a first time window within a duration (e.g., associated with a duration of stored feed element signals). In various examples, such a determination may be made by the past event search manager 725 based on an initiation or input from a user or operator, or based on an initiating or triggering event, or based on an operating condition or operating mode.

In some examples, the past event search manager 725 may be configured to perform an iterative search, such as the search process 500 described with reference to FIG. 5. For example, the past event search manager 725 may be configured to determine, based on an evaluation of a target spot beam signal indicating an absence of a target signal, to search for the target signal from a different location within the service coverage area (e.g., at a same or different time window within a duration of stored feed element signals). In some examples, the past event search manager 725 may be configured to determine or receive (e.g., from a user, from a lookup resource, from a path prediction model) a path hypothesis for a device associated with the target signal. In some examples, the past event search manager 725 may be configured determine one or more search locations, over various time windows, based on the path hypothesis for the device.

In some examples, the past event search manager 725 may be configured to determine or receive (e.g., from a user, from a lookup resource, from a frequency prediction model) a target frequency hypothesis for a target signal. To evaluate a target spot beam signal for a presence of a target signal, the past event search manager 725 may be configured to evaluate the target spot beam signal according to such a target frequency hypothesis.

In some examples, the past event search manager 725 may be configured to determine or receive (e.g., from a user, from a lookup resource, from a modulation prediction model) a target modulation scheme hypothesis for a target signal. To evaluate a target spot beam signal for a presence of a target signal, the past event search manager 725 may be configured to evaluate the target spot beam signal according to such a target modulation scheme hypothesis.

In some examples, the past event search manager 725 may be configured to determine or receive (e.g., from a user, from a lookup resource, from a symbol rate prediction model) a target symbol rate hypothesis for a target signal. To evaluate a target spot beam signal for a presence of a target signal, the past event search manager 725 may be configured to evaluate the target spot beam signal according to such a target symbol rate hypothesis.

In some examples, the past event search manager 725 may be configured to determine or receive (e.g., from a user, from a lookup resource, from a symbol rate prediction model) a target identifier hypothesis for a target signal. To evaluate a target spot beam signal for a presence of a target signal, the past event search manager 725 may be configured to evaluate the target spot beam signal according to such a target identifier hypothesis.

The past event beamforming processor 730 may be configured to process a stored set of feed element signals for a first time window according to a second beamforming configuration (e.g., different than a primary or real-time beamforming configuration) to generate a target spot beam signal corresponding to a location. In some examples, the past event beamforming processor 730 may be configured to process the stored set of feed element signals according to a target spot beam 125 that is different than each of the set of spot beams 125 associated with the first beamforming configuration (e.g., a different location, a different size, a different gain). In some examples, generating a target spot beam signal corresponding to a location includes processing a stored second set of feed element signals (e.g., from an antenna assembly 121 different than an antenna assembly associated with the first set of feed element signals) for the first time window according to a third beamforming configuration.

In some examples, the past event beamforming processor 730 may be configured to process the stored set of feed element signals for the first time window according to a third beamforming configuration to generate a second target spot beam signal corresponding to a second location. In some examples, the past event beamforming processor 730 may be configured to process the stored set of feed element signals for a second time window according to a fourth beamforming configuration to generate a third target spot beam signal corresponding to the second location.

In various examples, the past event beamforming processor 730 may include a component of a ground segment 102 (e.g., an access node terminal 130 or a network device 141, to support ground-based beamforming of a past event tracking mission or task), or the past event beamforming processor 730 may include a component of a satellite 120 (e.g., to support on-board beamforming of a past event tracking mission or task), which may or may not be the same satellite 120 that includes the antenna assembly 121 associated with the feed elements 128 of the feed element signals. In various examples, the past event beamforming processor 730 may or may not be associated with a same device as the real-time beamforming processor 715. In some examples, the past event beamforming processor 730 may be the same processor as the real-time beamforming processor 715, or share one or more components with the real-time beamforming processor 715.

The past event evaluation component 735 may be configured to evaluate target spot beam signals for a presence of a target signal. In various examples, such an evaluation may be based at least in part on hypotheses such as a target frequency hypothesis, a target modulation scheme hypothesis, a target symbol rate hypothesis, a target identifier hypothesis, and others. In various examples, the past event evaluation component 735 may include a component of a ground segment 102 (e.g., an access node terminal 130 or a network device 141, to support ground-based evaluation of spot beam signals), or the past event evaluation component 735 may include a component of a satellite 120 (e.g., to support on-board evaluation of spot beam signals). In various examples, the past event evaluation component 735 may or may not be included in or otherwise associated with a same device as the past event beamforming processor 730.

Figure 8:
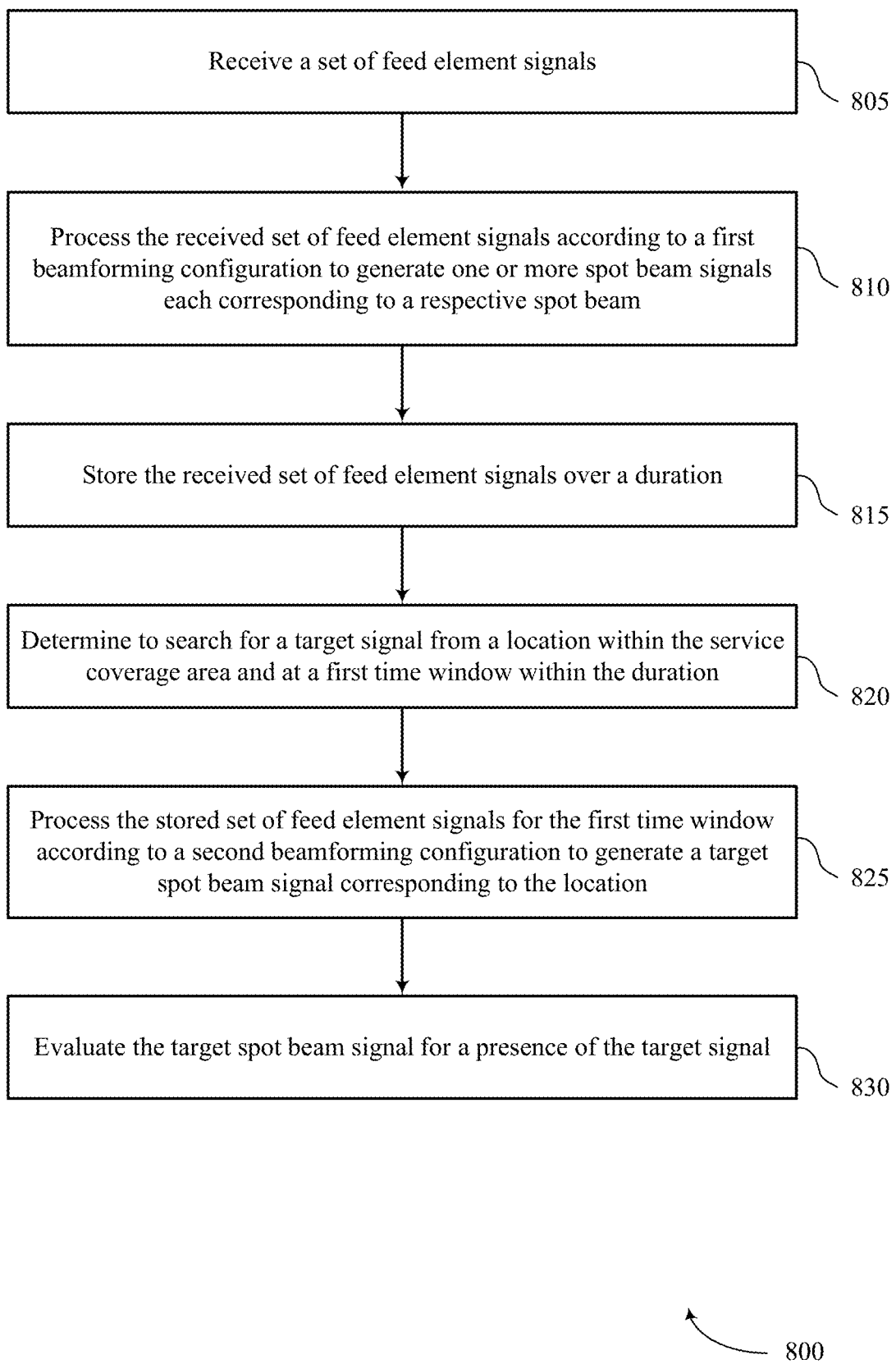
FIG. 8 shows a flowchart illustrating a method that supports past event signal tracking in accordance with examples as disclosed herein.

FIG. 8 shows a flowchart illustrating a method 800 that supports past event signal tracking in accordance with examples as disclosed herein. The operations of method 800 may be implemented by a reception processing system or its components as described herein. For example, the operations of method 800 may be performed by a reception processing system as described with reference to FIG. 4 or 7. In some examples, a reception processing system may execute a set of instructions to control the functional elements of the reception processing system to perform the described functions. Additionally or alternatively, a reception processing system may perform aspects of the described functions using special-purpose hardware.

At 805, the reception processing system may receive a set of feed element signals. Each feed element signal of the set may correspond to a respective one of a set of feed elements of a feed array of an antenna having a service coverage area. The operations of 805 may be performed according to the techniques described herein. In some examples, aspects of the operations of 805 may be performed by a feed element signal receiver as described with reference to FIG. 7.

At 810, the reception processing system may process the received set of feed element signals according to a first beamforming configuration (e.g., associated with a set of spot beams of the antenna) to generate one or more spot beam signals each corresponding to a respective spot beam. In some examples, the one or more spot beam signal may include communications scheduled for transmission or reception via respective ones of the set of spot beams. In some examples, the processing at 810 may be associated with a primary mission or a real-time mission supported by the reception processing system. The operations of 810 may be performed according to the techniques described herein. In some examples, aspects of the operations of 810 may be performed by a real-time beamforming processor as described with reference to FIG. 7.

At 815, the reception processing system may store the received set of feed element signals over a duration. The operations of 815 may be performed according to the techniques described herein. In some examples, aspects of the operations of 815 may be performed by a storage component as described with reference to FIG. 7.

At 820, the reception processing system may determine to search for a target signal from a location within the service coverage area and at a first time window within the duration.

In some examples, the processing at 820 may be associated with a secondary mission or a past event search or past event tracking functionality supported by the reception processing system, which may be triggered or initiated by a user command or instructions, an initiating event, or an operational mode. The operations of 820 may be performed according to the techniques described herein. In some examples, aspects of the operations of 820 may be performed by a past event search manager as described with reference to FIG. 7.

At 825, the reception processing system may process the stored set of feed element signals for the first time window according to a second beamforming configuration (e.g., associated with a searching spot beam of the antenna) to generate a target spot beam signal corresponding to the location. The operations of 825 may be performed according to the techniques described herein. In some examples, aspects of the operations of 825 may be performed by a past event beamforming processor as described with reference to FIG. 7.

At 830, the reception processing system may evaluate the target spot beam signal for a presence of the target signal. The operations of 830 may be performed according to the techniques described herein. In some examples, aspects of the operations of 830 may be performed by a past event evaluation component as described with reference to FIG. 7.

In some examples, an apparatus as described herein may perform a method or methods, such as the method 800. The apparatus may include features, components, means, or instructions (e.g., a non-transitory computer-readable medium storing instructions executable by a processor) for receiving a set of feed element signals (e.g., corresponding to feed elements of a feed array of an antenna having a service coverage area), processing the received set of feed element signals according to a first beamforming configuration to generate one or more spot beam signals each corresponding to a respective spot beam, storing the received set of feed element signals over a duration, determining to search for a target signal from a location within the service coverage area and at a first time window within the duration, processing the stored set of feed element signals for the first time window according to a second beamforming configuration to generate a target spot beam signal corresponding to the location, and evaluating the target spot beam signal for a presence of the target signal.

Some examples of the method 800 and the apparatus described herein may further include operations, features, components, means, or instructions for determining, based on the evaluating the target spot beam signal indicating an absence of the target signal, to search for the target signal from a second location within the service coverage area and at the first time window within the duration, processing the stored set of feed element signals for the first time window according to a third beamforming configuration (e.g., associated with another searching spot beam of the antenna) to generate a second target spot beam signal corresponding to the second location, and evaluating the second target spot beam signal for a presence of the target signal.

Some examples of the method 800 and the apparatus described herein may further include operations, features, components, means, or instructions for determining a path hypothesis for a device associated with the target signal, and determining the location based on the path hypothesis for the device.

Some examples of the method 800 and the apparatus described herein may further include operations, features, components, means, or instructions for determining, based on a path hypothesis for the device, to search for the target signal from a second location within the service coverage area and at a second time window within the duration, processing the stored set of feed element signals for the second time window according to a fourth beamforming configuration (e.g., associated with another searching spot beam of the antenna) to generate a third target spot beam signal corresponding to the second location, and evaluating the third target spot beam signal for the presence of the target signal.

In some examples of the method 800 and the apparatus described herein, processing according to the second beamforming configuration may include operations, features, components, means, or instructions for processing the stored set of feed element signals according to a target spot beam that is different than each of the set of spot beams associated with the first beamforming configuration. For example, the target spot beam may have a different size, a different orientation, a different coverage area size or location, a different set of phase or amplitude gains or coefficients, or other differences compared to the spot beams of the first beamforming configuration. For example, the target spot beam for speculative or hypothetical signal searching may be different than spot beams used for a primary or real-time mission.

Some examples of the method 800 and the apparatus described herein may further include operations, features, components, means, or instructions for receiving a second set of feed element signals, each feed element signal of the second set corresponding to a respective one of a second set of feed elements of a feed array of a second antenna (e.g., having a second service coverage area), and storing the received second set of feed element signals over a second duration. In some examples, generating the target spot beam signal corresponding to the location may include operations, features, components, means, or instructions for processing the stored second set of feed element signals for a first time window according to a fifth beamforming configuration (e.g., associated with a searching spot beam of the second antenna).

In some examples of the method 800 and the apparatus described herein, storing the received set of feed element signals may include operations, features, components, means, or instructions for oversampling the received set of feed element signals relative to a bandwidth of the received set of feed element signals.

Some examples of the method 800 and the apparatus described herein may further include operations, features, components, means, or instructions for determining a target frequency hypothesis for the target signal, and evaluating the target spot beam signal for a presence of the target signal may include evaluating the target spot beam signal according to the determined target frequency hypothesis.

Some examples of the method 800 and the apparatus described herein may further include operations, features, components, means, or instructions for determining a target modulation scheme hypothesis for the target signal, and evaluating the target spot beam signal for a presence of the target signal may include evaluating the target spot beam signal according to the determined target modulation scheme hypothesis.

Some examples of the method 800 and the apparatus described herein may further include operations, features, components, means, or instructions for determining a target symbol rate hypothesis for the target signal, and evaluating the target spot beam signal for a presence of the target signal may include evaluating the target spot beam signal according to the determined target symbol rate hypothesis.

Some examples of the method 800 and the apparatus described herein may further include operations, features, components, means, or instructions for determining a target identifier hypothesis for the target signal, and evaluating the target spot beam signal for a presence of the target signal may include evaluating the target spot beam signal according to the determined target identifier hypothesis.

In some examples of the method 800 and the apparatus described herein, processing the received set of feed element signals according to the first beamforming configuration may include operations, features, components, means, or instructions for processing at a ground segment.

In some examples of the method 800 and the apparatus described herein, processing the received set of feed element signals according to the first beamforming configuration may include operations, features, components, means, or instructions for processing at a satellite including the antenna.

In some examples of the method 800 and the apparatus described herein, receiving the set of feed element signals may include operations, features, components, means, or instructions for receiving the set of feed element signals at a set of ground stations of a ground segment.

In some examples of the method 800 and the apparatus described herein, processing the stored set of feed element signals according to the second beamforming configuration may include operations, features, components, means, or instructions for processing at a ground segment.

It should be noted that the described techniques refer to possible implementations, and that operations and components may be rearranged or otherwise modified and that other implementations are possible. Further portions from two or more of the methods or apparatuses may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code, the code comprising instructions executable by a processor to:

receive a plurality of feed element signals, each feed element signal of the plurality corresponding to a respective one of a plurality of feed elements of a feed array of an antenna having a service coverage area;

process the received plurality of feed element signals according to a first beamforming configuration associated with a plurality of spot beams to generate one or more spot beam signals each corresponding to a respective spot beam of the antenna, the one or more spot beam signals comprising communications scheduled for transmission via respective ones of the plurality of spot beams;

store the received plurality of feed element signals over a duration;

determine to search for a target signal from a location within the service coverage area and at a first time window within the duration;

process the stored plurality of feed element signals for the first time window according to a second beamforming configuration to generate a target spot beam signal corresponding to the location; and evaluate the target spot beam signal for a presence of the target signal.

2. The non-transitory computer-readable medium of claim 1, wherein the instructions are further executable by the processor to:

determine a path hypothesis for a device associated with the target signal; and determine the location based at least in part on the path hypothesis for the device.

3. The non-transitory computer-readable medium of claim 2, wherein the instructions are further executable by the processor to:

determine, based at least in part on the path hypothesis for the device, to search for the target signal from a second location within the service coverage area and at a second time window within the duration;

process the stored plurality of feed element signals for the second time window according to a fourth beamforming configuration to generate a third target spot beam signal corresponding to the second location; and evaluate the third target spot beam signal for the presence of the target signal.

4. The non-transitory computer-readable medium of claim 1, wherein the instructions are further executable by the processor to:

receive a second plurality of feed element signals, each feed element signal of the second plurality corresponding to a respective one of a second plurality of feed elements of a feed array of a second antenna having a second service coverage area; and store the received second plurality of feed element signals over a second duration, wherein the instructions to generate the target spot beam signal corresponding to the location are executable by the processor to process the stored second plurality of feed element signals for the first time window according to a third beamforming configuration.

5. The non-transitory computer-readable medium of claim 1, wherein the instructions to store the received plurality of feed element signals are executable by the processor to:

oversample the received plurality of feed element signals relative to a bandwidth of the received plurality of feed element signals.

6. The non-transitory computer-readable medium of claim 1, wherein the instructions are further executable by the processor to:

determine a target frequency hypothesis for the target signal, wherein the instructions to evaluate the target spot beam signal for a presence of the target signal are executable by the processor to evaluate the target spot beam signal according to the determined target frequency hypothesis.

7. The non-transitory computer-readable medium of claim 1, wherein the instructions are further executable by the processor to:

determine a target modulation scheme hypothesis for the target signal, wherein the instructions to evaluate the target spot beam signal for a presence of the target signal are executable by the processor to evaluate the target spot beam signal according to the determined target modulation scheme hypothesis.

8. The non-transitory computer-readable medium of claim 1, wherein the instructions are further executable by the processor to:

determine a target symbol rate hypothesis for the target signal, wherein the instructions to evaluate the target spot beam signal for a presence of the target signal are executable by the processor to evaluate the target spot beam signal according to the determined target symbol rate hypothesis.

9. The non-transitory computer-readable medium of claim 1, wherein the instructions are further executable by the processor to:

determine a target identifier hypothesis for the target signal, wherein the instructions to evaluate the target spot beam signal for a presence of the target signal are executable by the processor to evaluate the target spot beam signal according to the determined target identifier hypothesis.

10. The non-transitory computer-readable medium of claim 1, wherein the instructions are further executable by the processor to:

determine, based at least in part on the evaluating the target spot beam signal indicating an absence of the target signal, to search for the target signal from a second location within the service coverage area and at the first time window within the duration;

process the stored plurality of feed element signals for the first time window according to a third beamforming configuration to generate a second target spot beam signal corresponding to the second location; and evaluate the second target spot beam signal for a presence of the target signal.

11. The non-transitory computer-readable medium of claim 1, wherein the instructions to process according to the second beamforming configuration are executable by the processor to:

process the stored plurality of feed element signals according to a target spot beam that is different than each of the plurality of spot beams associated with the first beamforming configuration.

12. The non-transitory computer-readable medium of claim 1, wherein the instructions are executable by the processor of a ground segment of a satellite communications system.

13. The non-transitory computer-readable medium of claim 1, wherein the instructions are executable by a processor of a satellite of a satellite communications system.

* * * * *